(12) United States Patent
Kashani et al.

(10) Patent No.: US 12,340,918 B2
(45) Date of Patent: Jun. 24, 2025

(54) COMPOSITE WIRE

(71) Applicants: Hamzeh Kashani, Chandler, AZ (US); Wonmo Kang, Scottsdale, AZ (US)

(72) Inventors: Hamzeh Kashani, Chandler, AZ (US); Wonmo Kang, Scottsdale, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 169 days.

(21) Appl. No.: 18/169,320

(22) Filed: Feb. 15, 2023

(65) Prior Publication Data

US 2023/0282388 A1    Sep. 7, 2023

Related U.S. Application Data

(60) Provisional application No. 63/310,503, filed on Feb. 15, 2022.

(51) Int. Cl.
*H01B 13/32*    (2006.01)
*B82Y 30/00*    (2011.01)
(Continued)

(52) U.S. Cl.
CPC .............. *H01B 1/026* (2013.01); *B82Y 30/00* (2013.01); *H01B 1/04* (2013.01); *H01B 13/0026* (2013.01); *H01B 13/32* (2013.01)

(58) Field of Classification Search
CPC . H01B 1/02; H01B 1/026; H01B 1/04; H01B 7/02; H01B 7/0054; H01B 7/17; H01B 7/18; H01B 7/1875; H01B 7/20; H01B 7/295; H01B 11/18; H01B 13/0165; H01B 13/145; H01B 13/0026; H01B 13/32; H05B 3/10; H05B 3/56; C23C 16/44
(Continued)

(56) References Cited

U.S. PATENT DOCUMENTS 6,627,009 B1 *   9/2003   Matsui ..................... C22C 9/00
                                                          148/436
10,923,887 B2 *   2/2021   Dal Re ................. H01F 17/045
(Continued)

FOREIGN PATENT DOCUMENTS

CN       105374410 A  *  3/2016  ............... H01B 1/02
CN       205789279 U  * 12/2016  ............. H01B 11/18
(Continued)

OTHER PUBLICATIONS

Ajmal, Muhammad, et al. "Fabrication of the best conductor from single-crystal copper and the contribution of grain boundaries to the Debye temperature." CrystEngComm 14.4 (2012): 1463-1467.
(Continued)

*Primary Examiner* — William H. Mayo, III
(74) *Attorney, Agent, or Firm* — Michael Best & Friedrich LLP

(57) ABSTRACT

A composite wire material may include a core wire including copper (Cu). The core wire material may include a first layer on a circumferential surface of the core wire, where the first layer includes graphene. The composite wire material may include a second layer on a circumferential surface of the first layer, where the second layer includes nickel (Ni).

9 Claims, 27 Drawing Sheets
(27 of 27 Drawing Sheet(s) Filed in Color)

(51) Int. Cl.
*H01B 1/02* (2006.01)
*H01B 1/04* (2006.01)
*H01B 13/00* (2006.01)

(58) Field of Classification Search
USPC .... 174/34, 68.1, 102 R–109, 110 R–120 SC; 428/408; 423/447.1, 448; 156/60, 182, 156/280
See application file for complete search history.

(56) References Cited

U.S. PATENT DOCUMENTS

| | | | | |
|---|---|---|---|---|
| 2005/0006126 | A1* | 1/2005 | Aisenbrey | G06K 19/07749 174/68.1 |
| 2010/0000754 | A1* | 1/2010 | Mann | H01B 11/06 174/34 |
| 2011/0087126 | A1* | 4/2011 | Zorzos | A61B 5/291 600/544 |
| 2012/0043107 | A1* | 2/2012 | Nair | H01B 7/0876 977/734 |
| 2012/0073859 | A1* | 3/2012 | Lo | H01L 24/745 205/159 |
| 2012/0128573 | A1* | 5/2012 | Yoo | C01B 32/18 977/843 |
| 2013/0140058 | A1* | 6/2013 | Kim | C01B 32/19 427/117 |
| 2013/0248229 | A1* | 9/2013 | Martens | H01B 13/00 228/115 |
| 2016/0228964 | A1* | 8/2016 | Perez | B23H 1/06 |
| 2018/0190406 | A1* | 7/2018 | Won | H01B 9/006 |
| 2020/0219637 | A1* | 7/2020 | Ahn | H01B 7/0054 |
| 2022/0199280 | A1* | 6/2022 | Lekarski | H01B 1/04 |

FOREIGN PATENT DOCUMENTS

| | | | | |
|---|---|---|---|---|
| CN | 207052358 U | * | 2/2018 | H01B 7/17 |
| CN | 209949464 U | * | 1/2020 | H05B 3/10 |
| WO | WO-2017039055 A1 | * | 3/2017 | C23C 16/26 |

OTHER PUBLICATIONS

Aniekwe, U. V., and T. A. Utigard. "High-temperature oxidation of nickel-plated copper vs pure copper." Canadian metallurgical quarterly 38.4 (1999): 277-281.

Bernasconi, R., and L. Magagnin. "ruthenium as diffusion barrier layer in electronic interconnects: current literature with a focus on electrochemical deposition methods." Journal of The Electrochemical Society 166.1 (2018): D3219.

Cao, Mu, et al. "Ultrahigh electrical conductivity of graphene embedded in metals." Advanced Functional Materials 29.17 (2019): 1806792.

Chen, Jianyu, et al. "Enhanced oxidation-resistant Cu—Ni core-shell nanowires: controllable one-pot synthesis and solution processing to transparent flexible heaters." Nanoscale 7.40 (2015): 16874-16879.

Chen, Shanshan, et al. "Oxidation resistance of graphene-coated Cu and Cu/Ni alloy." ACS nano 5.2 (2011): 1321-1327.

Zhao, Kai, et al. "High ampacity of superhelix graphene/copper nanocomposite wires by a synergistic growth-twisting-drawing strategy." Carbon 141 (2019): 198-208.

Durkan, C., and M. E. Welland. "Analysis of failure mechanisms in electrically stressed gold nanowires." Ultramicroscopy 82.1-4 (2000): 125-133.

Fang, Lisheng, et al. "Insulation performance evaluation of high temperature wire candidates for aerospace electrical machine winding application." 2013 IEEE Electrical Insulation Conference (EIC). IEEE, 2013, pp. 253-256.

Han, Baoshuai, et al. "Fabrication and densification of high performance carbon nanotube/copper composite fibers." Carbon 123 (2017): 593-604.

Ho, Cho Yen, et al. "Electrical resistivity of ten selected binary alloy systems." Journal of physical and chemical reference data 12.2 (1983): 183-322.

Hsieh, Ya-Ping, et al. "Complete corrosion inhibition through graphene defect passivation." ACS nano 8.1 (2014): 443-448.

Hu, C-K., et al. "Reduced electromigration of Cu wires by surface coating." Applied Physics Letters 81.10 (2002): 1782-1784.

Iguchi, Yusuke, et al. "On the miscibility gap of Cu—Ni system." Acta Materialia 148 (2018): 49-54.

Jang, Lee-Woon, et al. "Multilayered graphene grafted copper wires." Carbon 139 (2018): 666-671.

Kang, Dongwoo, et al. "Oxidation resistance of iron and copper foils coated with reduced graphene oxide multilayers." Acs Nano 6.9 (2012): 7763-7769.

Kashani, Hamzeh, et al. "An Axially Continuous Graphene-Copper Wire for High-Power Transmission: Thermoelectrical Characterization and Mechanisms." Advanced Materials 33.51 (2021): 2104208.

Kashani, Hamzeh, et al. "Extraordinary tensile strength and ductility of scalable nanoporous graphene." Science advances 5.2 (2019): eaat6951.

Kim, Sang Jin, et al. "Ultrastrong graphene-copper core-shell wires for high-performance electrical cables." ACS nano 12.3 (2018): 2803-2808.

Kwak, Jinsung, et al. "Oxidation behavior of graphene-coated copper at intrinsic graphene defects of different origins." Nature Communications 8.1 (2017): 1549.

Lekawa-Raus, Agnieszka, et al. "Electrical properties of carbon nanotube based fibers and their future use in electrical wiring." Advanced Functional Materials 24.24 (2014): 3661-3682.

Li, Xuesong, et al. "Large-area synthesis of high-quality and uniform graphene films on copper foils." science 324.5932 (2009): 1312-1314.

Loos, J. S., and B. A. Ter Haar. "Influence of heat treatments on the electrical resistance of thin film copper/electroless nickel microcircuit interconnections." Thin solid films 188.2 (1990): 247-258.

Lu, Lei, et al. "Ultrahigh strength and high electrical conductivity in copper." Science 304.5669 (2004): 422-426.

Luo, Qin, et al. "Surface modification of nickel-aluminum bronze alloy with gradient Ni—Cu solid solution coating via thermal diffusion." Surface and Coatings Technology 309 (2017): 106-113.

Matula, Richard Allen. "Electrical resistivity of copper, gold, palladium, and silver." Journal of Physical and Chemical Reference Data 8.4 (1979): 1147-1298.

Mehta, R., S. Chugh, and Z. Chen. "Transfer-free multi-layer graphene as a diffusion barrier." Nanoscale 9.5 (2017): 1827-1833.

Mehta, Ruchit, Sunny Chugh, and Zhihong Chen. "Enhanced electrical and thermal conduction in graphene- encapsulated copper nanowires." Nano letters 15.3 (2015): 2024-2030.

Morrow, Wayne K., Stephen J. Pearton, and Fan Ren. "Review of graphene as a solid state diffusion barrier." Small 12.1 (2016): 120-134.

Nøland, Jonas Kristiansen, et al. "High-power machines and starter-generator topologies for more electric aircraft: A technology outlook." IEEE access 8 (2020): 130104-130123.

Prasai, Dhiraj, et al. "Graphene: corrosion-inhibiting coating." ACS nano 6.2 (2012): 1102-1108.

Rathmell, Aaron R., et al. "Synthesis of oxidation-resistant cupronickel nanowires for transparent conducting nanowire networks." Nano letters 12.6 (2012): 3193-3199.

Rho, Hokyun, et al. "Metal nanofibrils embedded in long free-standing carbon nanotube fibers with a high critical current density." NPG Asia Materials 10.4 (2018): 146-155.

Rodrigues, Leon. High temperature embedded electrical machines for aerospace turbine applications. Diss. University of Sheffield, 2013.

Schriver, Maria, et al. "Graphene as a long-term metal oxidation barrier: worse than nothing." ACS nano 7.7 (2013): 5763-5768.

Serafin, Daria, Wojciech J. Nowak, and Bartek Wierzba. "The effect of surface preparation on high temperature oxidation of Ni, Cu and Ni—Cu alloy." Applied Surface Science 476 (2019): 442-451.

Shu, B. P., et al. "An investigation of grain boundary diffusion and segregation of Ni in Cu in an electrodeposited Cu/Ni micro-multilayer system." Materials Letters 89 (2012): 223-225.

(56) References Cited

OTHER PUBLICATIONS

Son, Myungwoo, et al. "Copper-graphene heterostructure for back-end-of-line compatible high-performance interconnects." npj 2D Materials and Applications 5.1 (2021): 41.

Strohbeen, Patrick J., et al. "Quantifying Mn Diffusion through Transferred versus Directly Grown Graphene Barriers." ACS Applied Materials & Interfaces 13.35 (2021): 42146-42153.

Subramaniam, Chandramouli, et al. "One hundred fold increase in current carrying capacity in a carbon nanotube-copper composite." Nature communications 4.1 (2013): 2202.

Varea, Aïda, et al. "Mechanical properties and corrosion behaviour of nanostructured Cu-rich CuNi electrodeposited films." International Journal of Electrochemical Science 7.2 (2012): 1288-1302.

Wang, Zijing, et al. "Ni—Cu interdiffusion and its implication for ageing in Ni-coated Cu conductors." Materials Science and Engineering: B 198 (2015): 86-94.

Weatherup, Robert S., et al. "Introducing carbon diffusion barriers for uniform, high-quality graphene growth from solid sources." Nano letters 13.10 (2013): 4624-4631.

Wei, Yong, et al. "Cu—Ag core-shell nanowires for electronic skin with a petal molded microstructure." Journal of Materials Chemistry C 3.37 (2015): 9594-9602.

Xu, Ying, et al. "Different graphene layers to enhance or prevent corrosion of polycrystalline copper." RSC advances 8.27 (2018): 15181-15187.

Yang, Ming, et al. "Simultaneously enhancing the strength, ductility and conductivity of copper matrix composites with graphene nanoribbons." Carbon 118 (2017): 250-260.

* cited by examiner (a) NiGCu-as sputtered (b) NiGCu-650°C-2hr

COMPOSITE WIRE

CROSS-REFERENCE TO RELATED APPLICATION

This application claims priority to U.S. Provisional Patent Application No. 63/310,503, filed Feb. 15, 2022, the entire contents of which are hereby incorporated by reference in its entirety.

STATEMENT OF GOVERNMENT INTEREST

This invention was made with government support under grants N00014-20-1-2396 and N00014-21-1-2396 awarded by the Office of Naval Research. The government has certain rights in the invention.

INTRODUCTION

The demand for new, high current density and ultrahigh temperature conducting materials is principally driven by the need to improve the efficiency and achieve viable long-term operation of conductors at higher temperatures used in electronic devices, aerospace, steel making, petrochemical and nuclear applications. Conventional Cu and Al wires dominate the interconnects in electronic devices and wire winding used for electrical machines for almost all applications. However, the temperature limit of such wires is below 200° C. because of thermal oxidation of copper at high temperatures. It is known that excessive oxidation of copper at high temperatures over a long period leads to a significant volume loss of the conductor and significant degradation of electrical properties.

Developing high-performance and durable conductors is a goal for achieving energy efficiency, safety, and long-term liability to replace Cu wires in power transmission cable and Cu windings in harsh environment. In this regard, conductive nanocomposites based on the carbon nanomaterials offer a viable high conductivity and current density alternative to conventional metallic materials such as Al and Cu. However, the high ampacity carbon materials-Cu composite wire still suffers from low temperature operation like pure Cu due to the very low oxidation resistance of exposed Cu to harsh environment in the case of carbon reinforced Cu composites and instability of graphene cap in case of graphene coated Cu wire during long time operation since the oxidation of graphene can start at a temperature lower than 400° C. The potential applications of next-generation high temperature wires require electrical conductivity and current density retention concurrent with good oxidation resistance.

One common approach to improve the high temperature stability of Cu is addition of an oxidation resistance layer such as Ni and Ag coating. For example, a Cu wire coated by a Ni shell integrates high oxidation resistance of Ni which is tenfold greater than Cu and excellent electrical conductivity of Cu core which has the highest volumetric electrical conductivity in a wide range of temperatures up to 450° C. among all metallic conductors, hence it is still considered a leading core conductor material for wires operating at high temperatures.

While such efforts enhance oxidation resistance in harsh environments, long-term exposure of Ni-coated copper wires to elevated temperature can give rise to extensive diffusion of nickel into copper which can cause severe increase in the electrical resistivity of the conductor and lower the current density limit. The functional degradation of Ni coated Cu wire due to the Ni—Cu interdiffusion expose Cu to the surface that eventually accelerate the oxidation rate and loss of conductive materials very rapidly as the temperature and time increase. Though the transmission cable and Cu winding in electrical motors should withstand considerably much higher localized temperatures over long time due to the coupling effect of environment temperature and internal heating generated by ohmic losses, preventing Ni diffusion is challenging. Furthermore, the large difference in the electrical resistivity and current density limit of pure Cu and Ni—Cu alloy prevents the use of a Ni-coated Cu wire subjected to high temperatures that sharply increases oxidation of these metals.

SUMMARY OF THE INVENTION

Materials, methods and techniques disclosed and contemplated herein relate to composite wire materials. In one aspect, a composite wire material is disclosed. Exemplary composite wire material may comprise a core wire comprising copper (Cu). The composite wire material may comprise a first layer on a circumferential surface of the core wire, where the first layer comprises graphene. The composite wire material may also comprise a second layer on a circumferential surface of the first layer, where the second layer comprises nickel (Ni).

In another aspect, a method of making a composite wire material is disclosed. The exemplary method may comprise annealing a core wire comprising at least 99.0% copper (Cu) at a temperature of about 850° C. to about 1100° C. under flowing mixed gaseous conditions comprising argon (Ar) and hydrogen ($H_2$); coating a graphene on a circumferential surface of the core wire to generate a graphene layer; and coating nickel (Ni) on a circumferential surface of the graphene layer to generate a nickel (Ni) layer.

There is no specific requirement that a material, technique or method relating to composite wire materials include all of the details characterized herein, in order to obtain some benefit according to the present disclosure. Thus, the specific examples characterized herein are meant to be exemplary applications of the techniques described, and alternatives are possible.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9D shows the temperature dependance against the electrical resistivity of Cu with varying Ni concentrations.

DETAILED DESCRIPTION

Figure 1A:
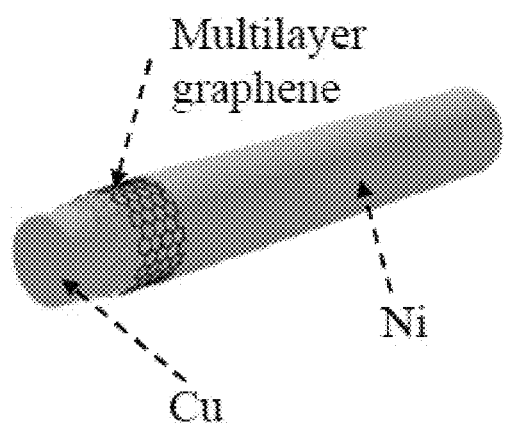
FIG. 1A shows an exemplary composite wire material.
Figure 1B:
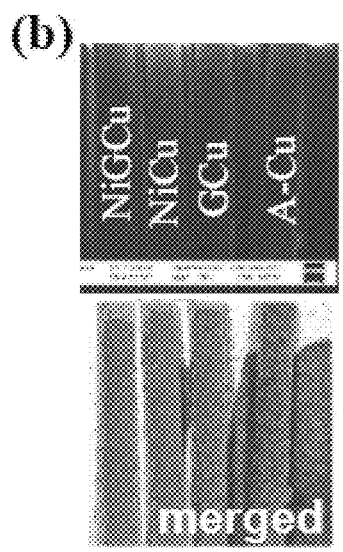
FIG. 1B shows various SEM images of graphene grown on a copper wire.
Figure 1C:
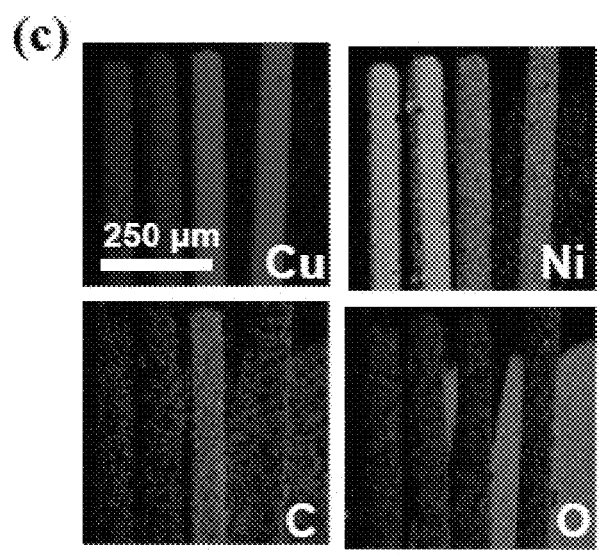
FIG. 1C shows various energy-dispersive spectroscopy (EDS) maps of copper, nickel, carbon, and oxygen.
Figure 1D:
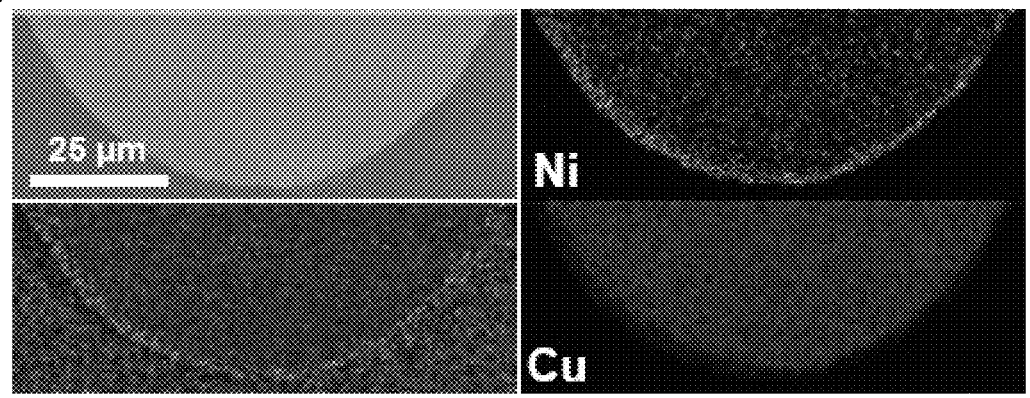
FIG. 1D shows various images of the nickel layer circumferentially coated around the copper core wire.
Figure 1E:
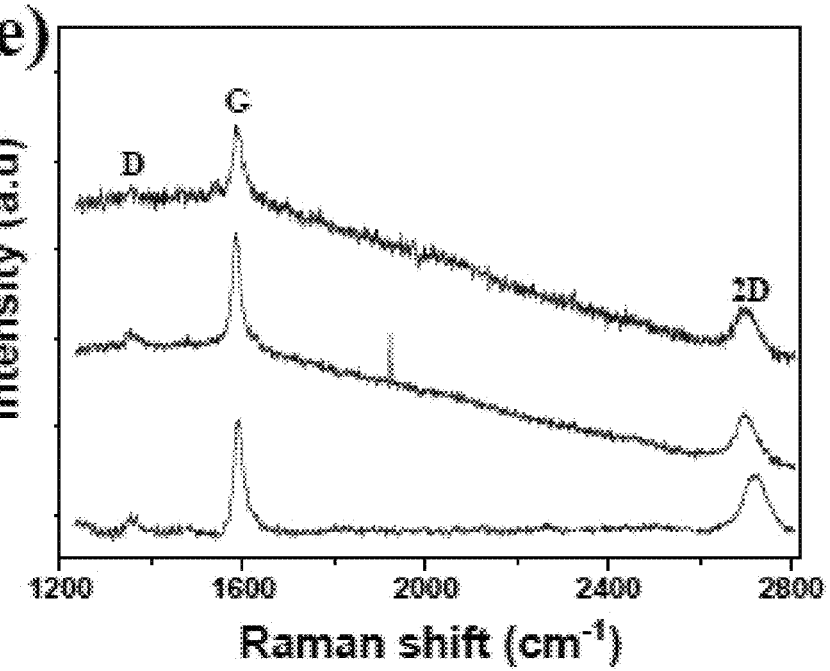
FIG. 1E shows the Raman spectra shift of graphene grown on copper.

The ability of current advanced conductors to withstand high-temperature operations remains limited to temperatures below 400° C. due to poor oxidation resistance and microstructural instability that leads to severe reduction in electrical conductivity and current density limit of conductors. The robustness of carbon nanomaterials and their potential for ultrahigh thermal stability has drawn substantial interest to develop new composite conductor for long time operation in harsh environment; severe oxidation and temperature greater than 400° C. Here, we have developed a multilayered graphene-metal composite wire by integrating an axially continuous highly-conductive graphene tubes between a copper wire and a nickel shell. We have experimentally demonstrated that this graphene-metal composite wire offers thermally stable electrical properties up to 650° C., far beyond the existing technologies for high-temperature conductors, including exceptionally low electrical resistivity and high current density retention after long term thermal cycles. This improved thermal stability can be attributed to graphene tubes that can effectively prevent Ni—Cu interdiffusion at high temperatures. These results can provide guidance for designing advanced composite conductors for harsh environments where the combination of oxidation resistance, retention of low resistivity and high current density is required.

To combat inefficiency losses, a potential solution is the development of microstructurally stable ultrahigh temperature conductor cable capable of long time operating at elevated temperatures; one such class of materials which shows potential in this regard is based on the disclosed continuous graphene metal composite, involving the Ni-graphene-Cu system.

Here, we show that multilayer core-shell structure including a Cu core covered with graphene as an intermediate shell and a Ni cap respectively (NiGCu), can be used at high temperature up to 650° C. Multilayer graphene can prevent the Ni—Cu interdiffusion at high temperatures, meanwhile, inhibiting oxidation of Cu and results in increased thermal stability. Therefore, the disclosed multilayer graphene composite compositions exhibit advantages over Cu wire and Ni coated Cu wire at high temperature application without sacrificing oxidation resistance of Ni and excellent electrical properties of Cu.

Exemplary Composite Wire Material

Various aspects of exemplary composite wire material are described below regarding exemplary components and physical properties.

Exemplary composite wire materials may comprise a core wire, a first layer, and a second layer. In various embodiments, the first layer is on a circumferential surface of the core wire, and a second layer is on a circumferential surface of the first layer.

In various embodiments, exemplary composite wire materials may comprise a core wire, where the core wire may comprise copper (Cu). In various embodiments, the core wire of exemplary composite wire material may comprise 90% to 99.99% pure copper (Cu). In various embodiments, the core wire may comprise 90% to 99.99% pure copper (Cu); 91% to 99.99% pure copper (Cu); 92% to 99.99% pure copper (Cu); 93% to 99.99% pure copper (Cu); 94% to 99.99% pure copper (Cu); 95% to 99.99% pure copper (Cu); 96% to 99.99% pure copper (Cu); 97% to 99.99% pure copper (Cu); 98% to 99.99% pure copper (Cu); 99% to 99.99% pure copper (Cu); or 99.0% pure copper (Cu).

In various embodiments, the core wire may comprise a diameter of about 5 µm to about 80 µm; about 25 µm to about 80 µm; about 45 µm to about 80 µm; about 65 µm to about 80 µm; or about 80 µm. In various embodiments, the core wire may comprise a diameter of no less than 5 µm; no less than 10 µm; no less than 15 µm; no less than 20 µm; no less than 30 µm; no less than 40 µm; no less than 50 µm; no less than 60 µm; or no less than 70 µm. In various embodiments, the core wire may comprise a diameter of no greater than 80 µm; no greater than 75 µm; no greater than 65 µm; no greater than 55 µm; no greater than 45 µm; no greater than 35 µm; no greater than 25 µm; no greater than 15 µm; or no greater than 10 µm.

In various embodiments, exemplary composite wire materials may comprise a first layer on a circumferential surface of the core wire, where the first layer may comprise graphene. In various embodiments, the first layer may comprise graphene and benzene. In various embodiments, the first layer may further comprise a plurality of graphene layers. In various embodiments, the first layer may include an intensity ratio of graphene of the 2D and G bands ($I_{2D}/I_G$ ratio) of about 1.

In various embodiments, exemplary composite wire materials may comprise a second layer on a circumferential surface of the first layer, where the second layer may further comprise nickel (Ni). In various embodiments, the second layer of exemplary composite wire material may comprise 90% to 99.99% pure nickel (Ni). In various embodiments, the core wire may comprise 90% to 99.99% pure nickel (Ni); 91% to 99.99% pure nickel (Ni); 92% to 99.99% pure nickel (Ni); 93% to 99.99% pure nickel (Ni); 94% to 99.99% pure nickel (Ni); 95% to 99.99% pure nickel (Ni); 96% to 99.99% pure nickel (Ni); 97% to 99.99% pure nickel (Ni); 98% to 99.99% pure nickel (Ni); 99% to 99.99% pure nickel (Ni); or 99.0% pure nickel (Ni).

In various embodiments, the second layer may comprise a thickness of about 0.1 µm to about 5 µm; about 1 µm to about 5 µm; about 1 µm to about 4 µm; about 1 µm to about 3 µm; about 1 µm to about 2 µm; or about 1 µm. In various embodiments, the second layer may comprise a thickness of no less than 0.1 µm; no less than 0.5 µm; no less than 1 µm; no less than 1.5 µm; no less than 2 µm; no less than 2.5 µm; no less than 3 µm; or no less than 4 µm. In various embodiments, the second layer may comprise a thickness of no greater than 5 µm; no greater than 4.5 µm; no greater than 3.5 µm; no greater than 2.5 µm; no greater than 1.5 µm; no greater than 1 µm; or no greater than 0.5 µm.

In various embodiments, when exemplary core wire materials are heated to temperatures up to about 650° C., the second layer and the core wire do not intermix. In various embodiments, the second layer and the core wire of exemplary core wire materials do not intermix because the first layer, which comprises graphene, completely separates the second layer and the core wire. Generally, graphene is impermeable to atoms and acts as a diffusion barrier.

In various embodiments, exemplary core wire materials may have a nickel (Ni) to nickel-copper (NiCu) volume fraction of about 2 vol. % to about 35 vol. %. A nickel (Ni) to nickel-copper (NiCu) volume fraction may be calculated using the equation represented below:

$$\text{Ni to NiCu volume fraction} = \frac{\text{Volume of nickel (Ni)}}{\text{Volume of nickel (Ni)} + \text{Volume of copper (Cu)}}$$

As shown in the equation, a nickel (Ni) to nickel-copper (NiCu) volume fraction is calculated based on the volume of the nickel (Ni) divided by the sum total of the volumes of nickel and copper (NiCu). For illustrative purposes as an example, an exemplary core wire material has an 80 µm diameter core, a volume of nickel (Ni) of 4.8 cm$^3$, a volume of copper (Cu) having 95.2 cm$^3$, and thus a nickel to nickel-copper volume fraction of 4.8%.

In various embodiments, exemplary core wire materials comprises a nickel (Ni) to nickel-copper (NiCu) volume fraction of about 2 vol. % to about 35 vol. %; about 5 vol. % to about 35 vol. %; about 10 vol. % to about 35 vol. %; about 15 vol. % to about 35 vol. %; about 20 vol. % to about 35 vol. %; 25 vol. % to about 35 vol. %; about 30 vol. % to about 35 vol. %. In various embodiments, exemplary composite wire materials may comprise a nickel (Ni) to nickel-copper (NiCu) volume fraction of no less than 2 vol. %; no less than 4 vol. %; no less than 8 vol. %; no less than 12 vol. %; no less than 16 vol. %; no less than 22 vol. %; no less than 28 vol. %; or no less than 33 vol. %. In various embodiments, exemplary composite wire materials may comprise a nickel (Ni) to nickel-copper (NiCu) volume fraction no greater than 34 vol. %; no greater than 32 vol. %; no greater than 24 vol. %; no greater than 22 vol. %; no greater than 18 vol. %; no greater than 15 vol. %; no greater than 11 vol. %; no greater than 9 vol. %; no greater than 7 vol. %; no greater than 5 vol. %; or no greater than 3 vol. %.

In various embodiments, exemplary composite wire materials may comprise an electrical resistivity that does not increase more than 20% after exemplary composite wire materials are heated to a temperature of 650° C. at atmospheric pressure and where the temperature is maintained at 650° C. for about 1 hour. In various embodiments, the no more than 20% electrical resistivity for exemplary composite wire materials when heated to 650° C. is compared against the electrical resistivity of exemplary composite wire materials which were not heated to 650° C.

In various embodiments, composite wire materials may comprise an electrical resistivity that does not increase more than 10% after exemplary composite wire materials are heated to a temperature of 650° C. at atmospheric pressure and where the temperature is maintained at 650° C. for about 1 hour. In various embodiments, the no more than 10% electrical resistivity for exemplary composite wire materials when heated to 650° C. is compared against the electrical resistivity of exemplary composite wire materials which were not heated to 650° C.

Methods of Manufacture of Exemplary Composite Wire Material

Exemplary composite wire material disclosed and contemplated herein may be manufactured according to methods described below.

In various embodiments, methods of making exemplary composite wire material may comprise annealing a core wire under flowing mixed gaseous conditions. Exemplary methods may comprise coating a circumferential surface of the annealed core wire with graphene to generate a graphene layer. Exemplary methods may comprise coating a circumferential surface of the graphene layer with nickel (Ni) to generate a nickel (Ni) layer.

In various embodiments, annealing the core wire at temperatures from about 850° C. to about 1100° C.; about 875° C. to about 1100° C.; about 900° C. to about 1100° C.; about 900° C. to about 1050° C.; about 950° C. to about 1050° C.; about 975° C. to about 1050° C.; about 1000° C. to about 1050° C.; or about 1000° C. In various embodiments, annealing the core wire at a temperature of no less than 850° C.; no less than 900° C.; no less than 950° C.; no less than 1000° C.; or no less than 1050° C. In various embodiments, annealing the core wire at a temperature of no greater than 1100° C.; no greater than 1075° C.; no greater than 1025° C.; no greater than 1000° C.; no greater than 975° C.; no greater than 925° C.; no greater than 875° C.; or no greater than 850° C.

In various embodiments, the flowing mixed gaseous conditions may comprise a flow rate of argon (Ar) at about 1300 standard cubic centimeters per minute (sccm) to about 1650 standard cubic centimeters per minute (sccm); about 1400 sccm to about 1650 sccm; about 1400 sccm to about 1600 sccm; about 1450 sccm to about 1600 sccm; about 1450 sccm to about 1550 sccm; about 1475 sccm to about 1525 sccm; or about 1500 sccm. In various embodiments, the flowing mixed gaseous conditions may comprise a flow rate of argon (Ar) of no less than 1300 sccm; no less than 1400 sccm; no less than 1450 sccm; no less than 1500 sccm; no less than 1550 sccm; or no less than 1600 sccm. In various embodiments, the flowing mixed gaseous conditions may comprise a flow rate of argon (Ar) of no greater than 1650 sccm; no greater than 1625 sccm; no greater than 1575 sccm; no greater than 1475 sccm; no greater than 1425 sccm; no greater than 1375; or no greater than 1325 sccm.

In various embodiments, the flowing mixed gaseous conditions may be performed at a flow rate of hydrogen ($H_2$) at about 75 standard cubic centimeters per minute (sccm) to about 120 standard cubic centimeters per minute (sccm); about 80 sccm to about 120 sccm; about 80 sccm to about 115 sccm; 85 sccm to about 115 sccm; 90 sccm to about 115 sccm; 90 sccm to about 110 sccm; 95 sccm to about 110 sccm; about 95 sccm to about 105 sccm; or about 100 sccm. In various embodiments, the flowing mixed gaseous conditions may be performed at a flow rate of hydrogen ($H_2$) at no less than 75 sccm; no less than 85 sccm; no less than 95 sccm; no less than 105 sccm; or no less than 115 sccm. In various embodiments, the flowing mixed gaseous conditions may be performed at a flow rate of hydrogen ($H_2$) at no greater than 120 sccm; no greater than 110 sccm; no greater than 100 sccm; no greater than 90 sccm; or no greater than 80 sccm.

In various embodiments, the flowing mixed gaseous conditions may be performed at a time range from about 15 minutes to about 25 minutes; 18 minutes to about 25 minutes; 18 minutes to about 22 minutes; 19 minutes to about 21 minutes; or about 20 minutes. In various embodiments, the flowing mixed gaseous conditions may be performed at a time range of no less than 15 minutes; no less than 18 minutes; no less than 20 minutes; no less than 22 minutes; or no less than 24 minutes. In various embodiments, the flowing mixed gaseous conditions may be performed at a time range of no greater than 25 minutes; no greater than 23 minutes; no greater than 21 minutes; no greater than 20 minutes; no greater than 19 minutes; or no greater than 17 minutes.

In various embodiments, coating a graphene layer on the circumferential surface of the core wire. In various embodiments, coating a graphene layer on the circumferential surface of the core wire may be performed at a flow rate of about 8 standard cubic centimeters per minute (sccm) to about 11 standard cubic centimeters per minute (sccm). In various embodiments, coating a graphene layer on the circumferential surface of the core wire may be performed at about 8 sccm to about 11 sccm; about 9 sccm to about 10 sccm; or about 10 sccm. In various embodiments, coating a graphene layer on the circumferential surface of the core wire may be performed at no less than 9 sccm; or no less than 11 sccm. In various embodiments, vapor depositing benzene on the circumferential surface of the core wire may be performed at no greater than 11 sccm; no greater than 10 sccm; or no greater than 9 sccm.

In various embodiments, coating a graphene layer on the circumferential surface of the core wire may be performed at a temperature of about 850° C. to about 1100° C.; about 875° C. to about 1100° C.; about 900° C. to about 1100° C.; about 900° C. to about 1050° C.; about 950° C. to about 1050° C.; about 975° C. to about 1050° C.; about 1000° C. to about 1050° C.; or about 1000° C. In various embodiments, coating a graphene layer on the circumferential surface of the core wire may be performed at a temperature of no less than 850° C.; no less than 900° C.; no less than 950° C.; no less than 1000° C.; or no less than 1050° C. In various embodiments, coating a graphene layer on the circumferential surface of the core wire may be performed at a temperature of no greater than 1100° C.; no greater than 1075° C.; no greater than 1025° C.; no greater than 1000° C.; no greater than 975° C.; no greater than 925° C.; no greater than 875° C.; or no greater than 850° C.

In various embodiments, coating a graphene layer on the circumferential surface of the core wire may be performed at a time range of about 5 minutes to about 12 minutes; about 6 minutes to about 12 minutes; about 7 minutes to about 12 minutes; 8 minutes to about 12 minutes; about 8 minutes to about 11 minutes; about 9 minutes to about 11 minutes; about 10 minutes to about 11 minutes; about 10 minutes to about 12 minutes; or about 10 minutes. In various embodiments, coating a graphene layer on the circumferential surface of the core wire may be performed at a time of no less than 5 minutes; no less than 7 minutes; no less than 9 minutes; or no less than 11 minutes. In various embodiments, coating a graphene layer on the circumferential surface of the core wire may be performed at a time of no greater than 12 minutes; no greater than 10 minutes; no greater than 8 minutes; or no greater than 6 minutes.

In various embodiments, vapor depositing benzene on the circumferential surface of the core wire. In various embodiments, the vapor depositing of benzene on the circumferential surface of the core wire may be performed at a flow rate of about 8 standard cubic centimeters per minute (sccm) to about 11 standard cubic centimeters per minute (sccm). In various embodiments, vapor depositing benzene on the circumferential surface of the core wire may be performed at about 8 sccm to about 11 sccm; about 9 sccm to about 10 sccm; or about 10 sccm. In various embodiments, vapor depositing benzene on the circumferential surface of the core wire may be performed at no less than 9 sccm; or no less than 11 sccm. In various embodiments, vapor depositing benzene on the circumferential surface of the core wire may be performed at no greater than 11 sccm; no greater than 10 sccm; or no greater than 9 sccm.

In various embodiments, vapor depositing benzene on the circumferential surface of the core wire may be performed at a temperature of about 850° C. to about 1100° C.; about 875° C. to about 1100° C.; about 900° C. to about 1100° C.; about 900° C. to about 1050° C.; about 950° C. to about 1050° C.; about 975° C. to about 1050° C.; about 1000° C. to about 1050° C.; or about 1000° C. In various embodiments, vapor depositing benzene on the circumferential surface of the core wire may be performed at a temperature of no less than 850° C.; no less than 900° C.; no less than 950° C.; no less than 1000° C.; or no less than 1050° C. In various embodiments, vapor depositing benzene on the circumferential surface of the core wire may be performed at a temperature of no greater than 1100° C.; no greater than 1075° C.; no greater than 1025° C.; no greater than 1000° C.; no greater than 975° C.; no greater than 925° C.; no greater than 875° C.; or no greater than 850° C.

In various embodiments, vapor depositing benzene may be performed at a time range of about 5 minutes to about 12 minutes; about 6 minutes to about 12 minutes; about 7 minutes to about 12 minutes; 8 minutes to about 12 minutes; about 8 minutes to about 11 minutes; about 9 minutes to about 11 minutes; about 10 minutes to about 11 minutes; about 10 minutes to about 12 minutes; or about 10 minutes. In various embodiments, vapor depositing benzene on the circumferential surface of the core wire may be performed at a time of no less than 5 minutes; no less than 7 minutes; no less than 9 minutes; or no less than 11 minutes. In various embodiments, vapor depositing benzene on the circumferential surface of the core wire may be performed at a time of no greater than 12 minutes; no greater than 10 minutes; no greater than 8 minutes; or no greater than 6 minutes.

In various embodiments, coating nickel (Ni) on the circumferential surface of the graphene layer may further comprise sputtering 99.0% pure nickel (Ni), thereby generating a nickel layer on the circumferential surface of the graphene layer.

In various embodiments, sputtering nickel (Ni) on the circumferential surface of the graphene layer may be performed at a pressure below $1 \times 10^{-7}$ Torr.

In various embodiments, sputtering nickel (Ni) on the circumferential surface of the graphene layer may be performed at a power of about 100 W to about 150 W. In various embodiments, sputtering nickel (Ni) on the circumferential surface of the graphene layer may be performed at a power at about 100 W to about 150 W; 100 W to about 140 W; about 100 W to about 130 W; about 100 W to about 125 W; about 100 W to about 115 W; or about 100 W. In various embodiments, sputtering nickel (Ni) on the circumferential surface of the graphene layer may be performed at a power of no less than 100 W; no less than 110 W; no less than 120 W; no less than 130 W; or no less than 140 W. In various embodiments, sputtering nickel (Ni) on the circumferential surface of the graphene layer may be performed at a power of no greater than 150 W; no greater than 145 W; no greater than 135 W; no greater than 125 W; no greater than 115 W; or no greater than 105 W.

In various embodiments, sputtering nickel (Ni) on the circumferential surface of the graphene layer may be performed at argon (Ar) pressure at about 1 mTorr to about 5 mTorr; about 1 mTorr to about 4 mTorr; about 2 mTorr to about 5 mTorr; about 2 mTorr to about 4 mTorr; or about 3 mTorr. In various embodiments, sputtering nickel (Ni) on the circumferential surface of the graphene layer may be performed at argon (Ar) pressure at no less than 1 mTorr; no less than 2 mTorr; or no less than 4 mTorr. In various embodiments, sputtering nickel (Ni) on the circumferential surface of the graphene layer may be performed at argon (Ar) pressure of no greater than 5 mTorr; no greater than 4 mTorr; no greater than 3 mTorr; or no greater than 1 mTorr.

In various embodiments, sputtering nickel (Ni) may further be performed at a rate of about 9 nm/minute to about 10 nm/minute; or about 9 nm/minute.

In various embodiments, the nickel layer may comprise a thickness of about 0.5 µm to about 5 µm; about 0.5 µm to about 4 µm; about 1 µm to about 4 µm; about 1 µm to about 3 µm; about 1 µm to about 2 µm; or about 1 µm. In various embodiments, the nickel layer may comprise a thickness of no less than 0.5 µm; no less than 2 µm; or no less than 4 µm. In various embodiments, the nickel layer may comprise a thickness of no greater than 5 µm; no greater than 4 µm; no greater than 3 µm; or no greater than 1 µm.

Results and Discussion

Microstructural Characterization

The synthesis process and microstructure of NiGCu multilayer structure are graphically summarized in FIG. 1 and FIG. 7. Chemical vapor deposition (CVD) is a promising method to produce high-quality and large-area graphene, which enable one to grow continuous graphene tube on metallic wires. Recently, we prepared axially continuous multilayer graphene coated Cu wire with enhanced electrical properties using the CVD graphene growth method. Graphene coated Cu wire (GCu) is synthesized using the CVD method in which graphene is concurrently grown on the surface of 10-, 25- and 80-µm diameter Cu wires at 1000° C. (FIG. 1b, middle SEM image). Multiple Raman spectra from different region in FIG. 1e, confirm that multilayer graphene with a FWHM >60 cm$^{-1}$ and an intensity ratio of the 2D and G bands ($I_{2D}/I_G$ ratio) close to 1 is grown on the Cu wires. The weak D peak(s) in Raman spectra of the graphene demonstrates the high-quality of synthesized graphene. Annealed Cu wires (A-Cu) with different diameter are prepared and served as the control samples. A conformal Ni film with the thickness of ~1 µm is then deposited on the surface of both A-Cu and GCu wires by magnetron sputtering to fabricate Ni coated Cu (NiCu) and Ni coated GCu (NiGCu) wires respectively (FIG. 1a). Note that there are six different types of wire samples: NiCu10, 25, 80 and NiGCu10, 25, 80 where the integers indicate the nominal diameters of core Cu wires.

We estimated the nickel (Ni) to nickel-copper (NiCu) volume fractions are 4.8 vol. %, 14 vol. %, and 30 vol. % Ni for 80-, 25- and 10-µm-diameter Cu wires, respectively, given the 1 µm-thick Ni shell. The Energy-Dispersive Spectroscopy (EDS) maps, depicting a two-dimensional projection of the elemental distribution (Cu and Ni are shown in red and green respectively) in FIGS. 1c and d reveal the Cu-core and Ni-shell structure and confirm that uniform and the continuous Ni shell is circumferentially coated around the Cu core.

FIG. 1 Microstructure characterization. (a) A schematic of the NiGCu multilayer wire. (b) SEM images of annealed (A-Cu), graphene coated (GCu), Ni coated Cu (NiCu) and Ni coated GGu (NiGCu) wires. (c) EDS-elemental distribution maps of Cu (top left), Ni (top right), C (bottom left) and O (bottom right) corresponding to wires in (b). (d) EDS-Maps from cross section of NiCu wire show the elemental distribution of Cu and Ni. (e) Multiple Raman spectra of graphene grown on Cu wires at 1000° C. Wires were annealed at 1000° C. for 20 minutes, then graphene was grown on the Cu wires for 10 minutes flowing of benzene (10 sccm).

Electrical Resistivity and Thermal Stability

Figure 7A:
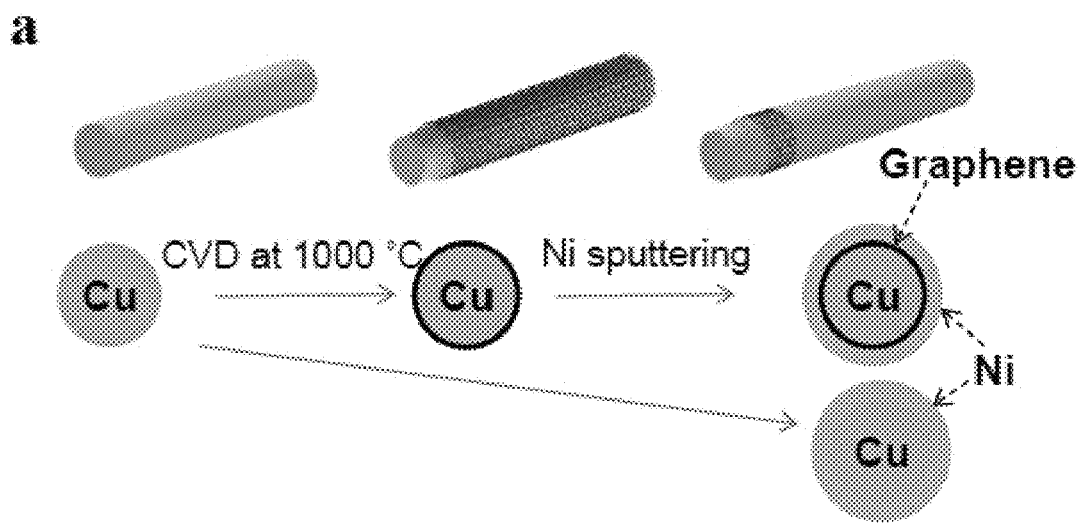
FIG. 7A shows an exemplar method of manufacture of exemplary composite wire material.
Figure 7B:
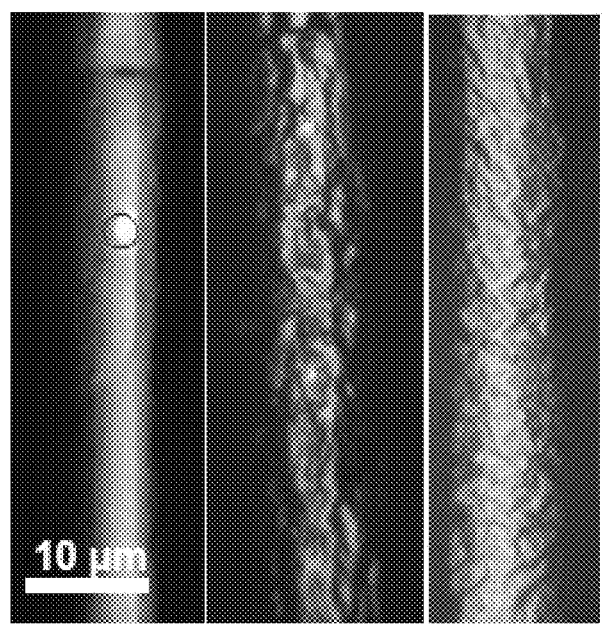
FIG. 7B shows optical images of annealed, graphene coated, and Ni coated composite wire materials.
Figure 7C:
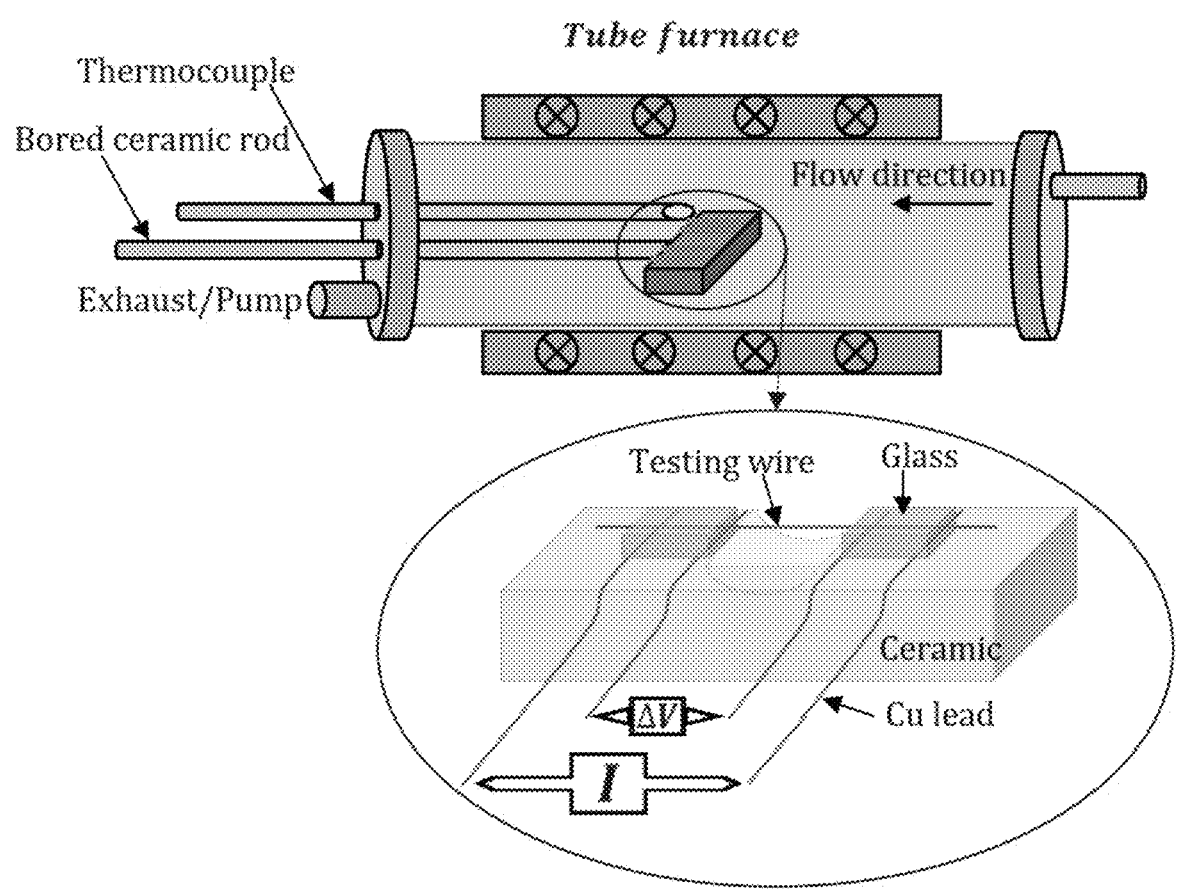
FIG. 7C shows an exemplary schematic system to measure the temperature dependence of electrical resistivity and current carrying capability of composite wire materials.
Figure 7D:
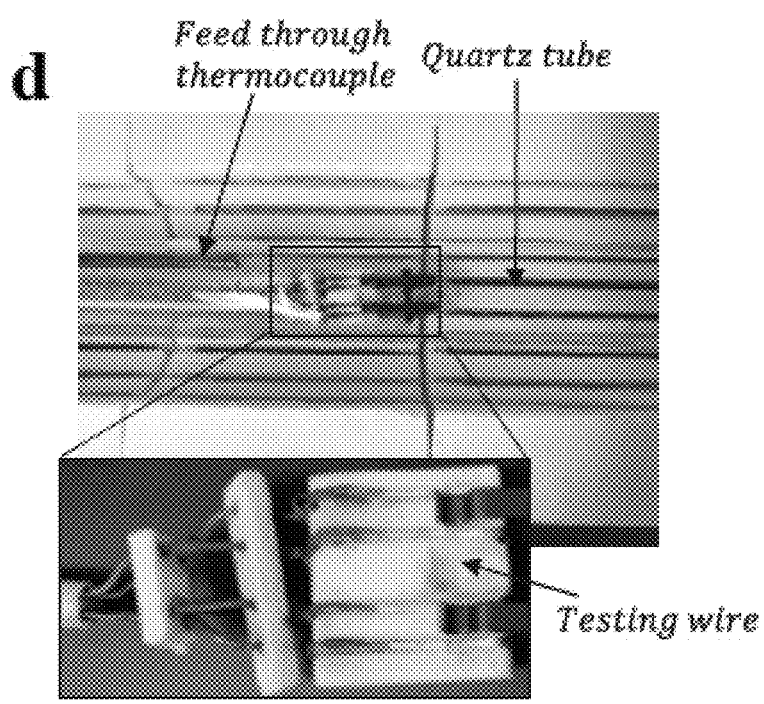
FIG. 7D shows an exemplary apparatus to measure the temperature dependence of electrical resistivity and current carrying capability of wire in controlled environments.

The electrical properties of conductors can be influenced by temperature and time. Therefore, thermal stability of the wire and electrical conductivity at elevated temperature are properties that suit a material for long time operation at high temperature. To elucidate the temperature-dependent electrical resistivity and thermal stability stemmed from continuous graphene tubes, we conducted electrical characterization of NiCu and NiGCu wires in a temperature controlled environment. For each wire sample, three different target temperatures (i.e., 450° C., 550° C., and 650° C.) were used where each target temperature was maintained for 1 hour (i.e., 1-hr holding). Temperature and electrical resistivity were concurrently and continuously recorded during each experiment. After 1 hour holding at 650° C., the temperature was rapidly cooled to room temperature by forced air circulation. For accurate temperature measurements, a k-type thermocouple was placed near the wire sample as shown in FIG. 7c,d.

Figure 2A:
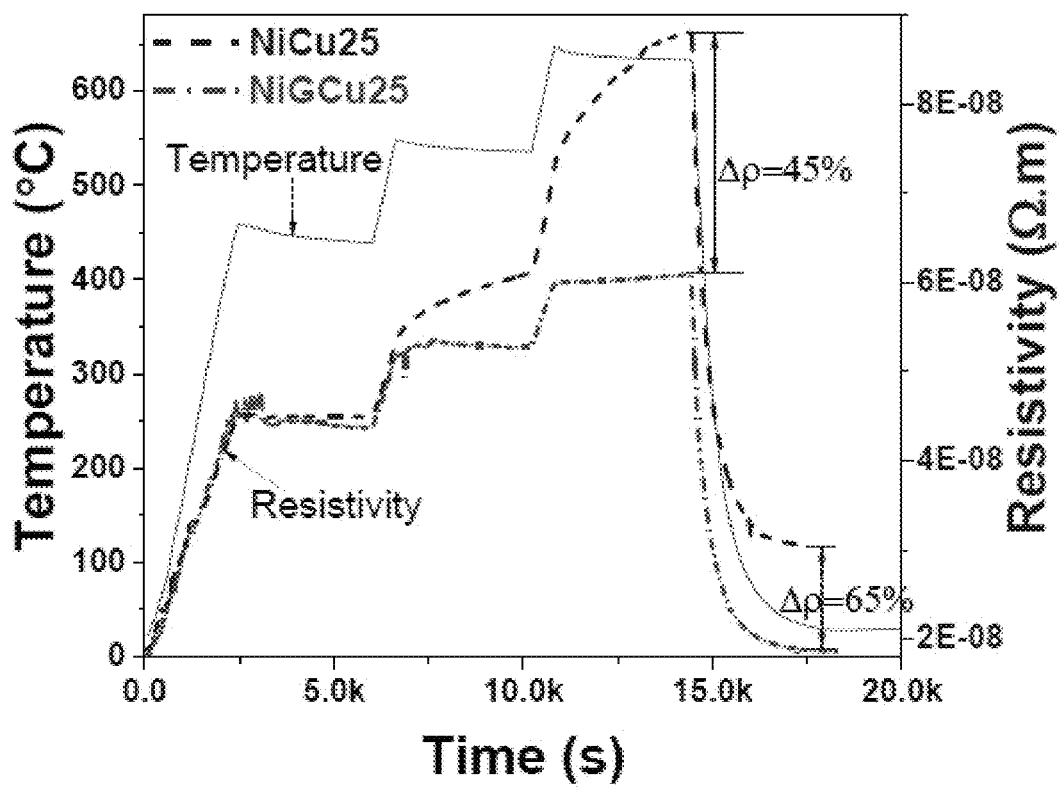
FIG. 2A shows the temperature and resistive measurements for NiCu25 and NiGCu25 over time.

FIG. 2a shows the temperature and resistive measurements for NiCu25 and NiGCu25 in time. The vertical axes on the left and right are for the measured temperature (black solid line) and the corresponding resistivity of NiCu25 (blue dashed line) and NiGCu25 (red dashed line), respectively. As mentioned above, the measured temperature profile exhibits a stepwise increase from room temperature to the target temperatures with 1-hr holding at each target temperature. Note that slight overshooting occurs above each target temperature and then measured temperature decreases below the target during 1-hr holding.

Figure 2B:
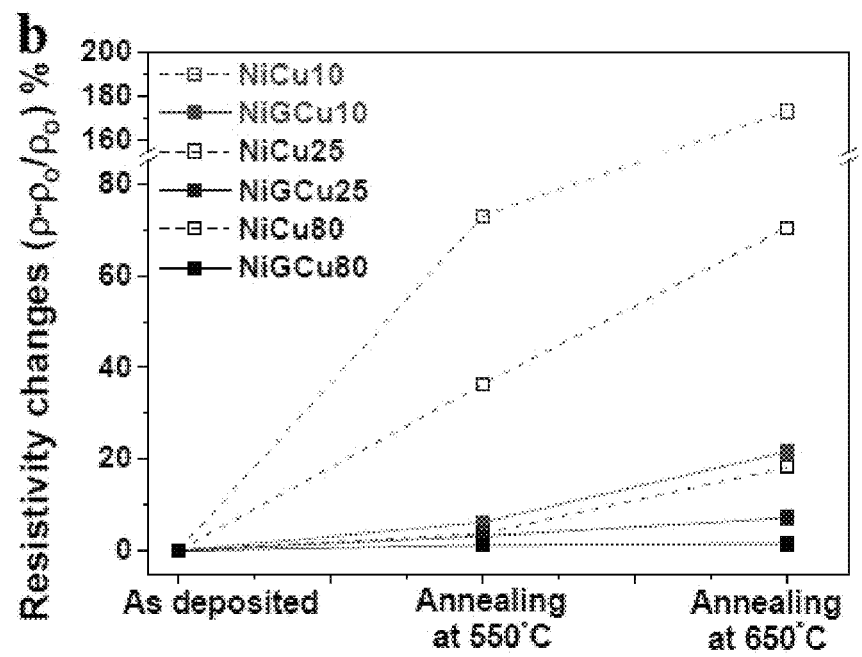
FIG. 2B shows the combination from size effect and annealing effect on the resistivity of NiCu and NiGCu composite wire materials.
Figure 8A:
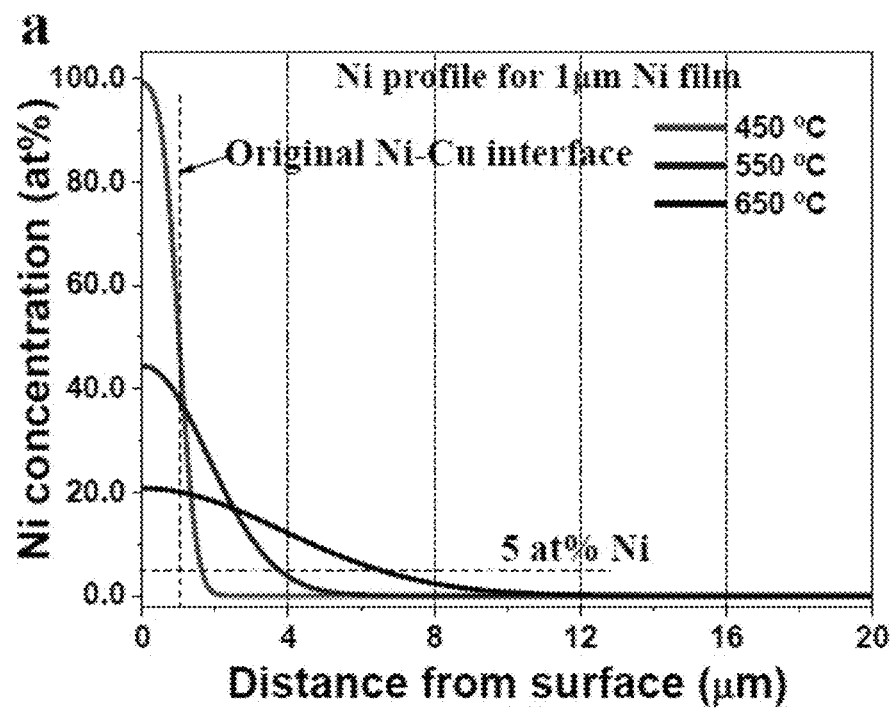
FIG. 8A shows the nickel (Ni) concentration-distance profiles of exemplary composite wire materials having been annealed at various temperatures.
Figure 8B:
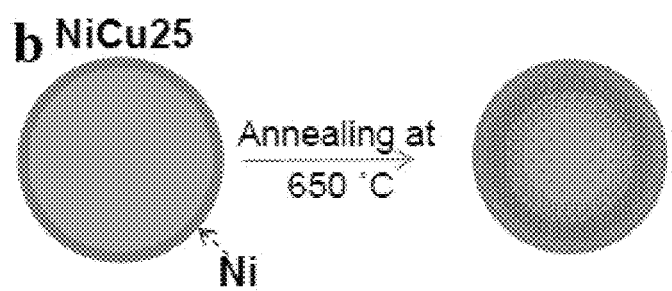
FIG. 8B shows a NiCu25 composite wire material annealed at 650° C.

An increase in electrical resistivity is expected in both samples due to positive temperature coefficient of resistivity. However, the specific trend rises to the peak temperature of 458° C. The electrical resistivity of NiGCu25 slightly decreases as the temperature decreases from peak temperature of 458° C. to 439° C., while the electrical resistivity of NiCu25 sample remains constant during 1-hr holding indicating that the interdiffusion of Ni—Cu can start and increase the electrical resistivity of NiCu25 wire. For a temperature greater than 450° C., there appears to be a very distinct difference between resistivity profile of NiCu25 and NiGCu25 wires. In the NiGCu25 wire, there is no changes in the resistivity during 1-hr holding at ~550° C. and ~650° C. It is notable that the original resistivity of NiGCu25 before thermal cycle is perfectly retained after cooling down the sample to room temperature, demonstrating the excellent microstructure stability of Ni—Cu interface driven from high thermal stability of graphene tube sandwiched between Ni shell and Cu core. In contrast, the electrical resistivity of the NiCu25 wire is increased towards both the temperature and the time increment. For example, after 1-hour heating at ~450° C., NiCu25 and NiGCu25 samples have the electrical resistivity of $4.46 \times 10^{-8}$ Ω·m and $4.37 \times 10^{-8}$ Ω·m respectively. As the temperature increases from 439° C. (at the end of holding) to 548° C., the electrical resistivity of NiCu25 and NiGCu25 gradually increases to $5.56 \times 10^{-8}$ Ω·m and $5.3 \times 10^{-8}$ Ω·m respectively, such that the NiCu25 shows about 5% higher resistivity than the NiGCu25. The gap between electrical resistivity of the NiCu25 and NiGCu25 expressed as $\Delta\rho_G (\%) = (\rho_{NiCu} - \rho_{NiGCu})/\rho_{NiGCu} * 100$ becomes wider by increasing either annealing temperature or time during holding stage and reaches to a value 45% after 1-hr holding at ~650° C. The electrical resistivity of NiCu25 after 1-hr holding at ~650° C. (the temperature decreases from peak temperature of 647° C. to 633° C. during 1-hr holding) reaches to $8.8 \times 10^{-8}$ Ω·m showing signs of degradation of the Ni—Cu interface in NiCu wire. As the temperature decreases to room temperature using fast cooling, the electrical resistivity decreases to $3.05 \times 10^{-8}$ Ω·m which is ~65% higher than its original value and the resistivity of NiGCu25 experienced same thermal cycle. The results demonstrate the excellent thermal stability of Ni—Cu interface originated from graphene tube sandwiched between Cu core and Nickel shell which prevents the intermixing of Ni and Cu up to ~650° C. FIG. 2b summarizes the contribution from size effect and annealing effect on the resistivity of the NiCu and NiGCu wires. Four-point measurement performed to evaluate the electrical resistivity of the wire samples. The value of Y axis, $\Delta\rho = (\rho - \rho_0)/\rho_0 * 100$, represents the extent of resistivity change between the resistivity of annealed wire ($\rho$) and that of as-synthesized wire ($\rho_0$). The results highlight strong thermal annealing effect and size dependance annealing effect on the electrical resistivity. Regardless of the wire diameter, electrical resistivity of NiCu samples (blank squares) increases after annealing at high temperatures compared to the NiGCu (solid squares) that indicate very small increment rate in electrical resistivity. There is 73% increase in the electrical resistivity of NiCu10 as the samples annealed at 550° C. for 2 hr. It is noted that, NiGCu10 wire exhibit only 6% increase in the electrical resistivity after annealing at the same temperature, demonstrating excellent electrical conductivity retention. With increasing annealing temperature to 650° C., there is a significant rise in the electrical resistivity of NiCu10 wire with maximum rise of 174%, much higher than the rise observed in NiGCu10 wire (20%). Such rise in electrical resistivity of the NiCu10 can be attributed to interdiffusion of the Ni—Cu interface at elevated temperatures. The interdiffusion of Ni—Cu accelerates at higher temperature, which increase the depth of the alloyed region with high electrical resistivity (See FIG. 8 and supplementary text).

FIG. 2 Electrical properties of NiCu and NiGCu wires before and after thermal cycle. (a) The temperature-dependent electrical resistivity of the NiCu and NiGCu wires for $d_w=25$ μm. The temperature (black solid line) and resistivity (blue and red dashed lines are for the NiCu and NiGCu wires, respectively) measurements are synchronized by time. The measured temperature and corresponding resistivity values are given using the vertical axes on the left and right, respectively. (b) Summary of the electrical resistivity values for all the wires before annealing (i.e., as deposited) and after annealing at 550 and 650° C. Note that dotted and solid lines indicate NiCu and NiGCu wires while black, blue, and red colors indicate $d_w=80$ μm, =25 μm, and =10 μm, respectively.

From FIG. 2b, we can see a size dependence temperature effect of $\Delta\rho$ for the NiCu wires with different diameters (10, 25, and 80 μm), the larger the diameter of the wire, the lower increasing rate in the resistivity is achieved. At the same annealing temperature (550° C.), as the diameter increases from 10 to 25 and 80 μm, $\Delta\rho$ decreases, from 73% (for NiCu10) to 36% (for NiCu25) and 3.7% (for NiCu80). There is also sudden rise in Δρ of NiCu wires (see the blank markers) when the annealing temperature increases up to 650° C. In contrast, the electrical resistivity of NiGCu undergoes changes very slightly after annealing at 550 and 650° C. irrespective of the wire diameter, which means that the thermally stable interface stemmed from graphene tube prevents interdiffusion across Ni—Cu couple. One interpretation of these results is that decreasing wire diameter affects the estimated nickel (Ni) to nickel-copper (NiCu) volume fraction of alloying zone in composite wires that are associated with annealing at high temperature. All wires were subjected to same thermal cycle (annealing or CVD at 1000° C.), then, concurrently loaded into sputtering machine so that the thickness of Ni coating and microstructure of Cu and Ni are same in all samples which minimize the effect of microstructure on the size dependance temperature effect. Therefore, size dependent temperature effect can be solely contributed by the nickel (Ni) to nickel-copper (NiCu) volume fraction of the alloyed zone of Cu and Ni core-shell structure because the diffusion depth is independent of the wire diameter and only dependent on the annealing temperature and time. For the thin film Ni around Cu wire, the diffusion depth correlated with the temperature and time can be described using the non-steady state diffusion equation:

$$C_{(x,\tau)} - C_1 = (C_0 - C_1) * \left[ 2 \, \text{erf}\left( \frac{h+x}{2\sqrt{Dx}} \right) + \text{erf}\left( \frac{h-x}{2\sqrt{Dx}} \right) \right]$$

where $C_{(x,t)}$, $C_1$, and $C_0$ are the concentration of Ni at the depth of x, concentration of Cu at surface and concentration of Ni at surface, respectively. D and h are the diffusion coefficient of Ni in Cu and thickness of Ni respectively. Considering h=1 μm and D=$10^{-15}$ m$^2$/s (at 650° C.), D=$2*10^{-16}$ m$^2$/s (at 550° C.) and D=$1*10^{-17}$ m$^2$/s (at 450° C.), we plotted the chemical profile of Ni distribution in FIG. 8a. We used the chemical composition at 5% Ni as a reference for comparison, where its electrical resistivity ($7\times10^{-8}$ Ω·m) is greater than pure Cu ($1.72\times10^{-8}$ Ω·m). It can be seen that for the Ni—Cu diffusion couple annealed at 550 and 650° C., the diffusion depth from Ni—Cu interface with Ni concentration higher than 5 at % is about 3 and 6 μm, respectively. We used SEM-EDS elemental mapping to experimentally quantify the interdiffusion of Ni and Cu.

Figure 3A:
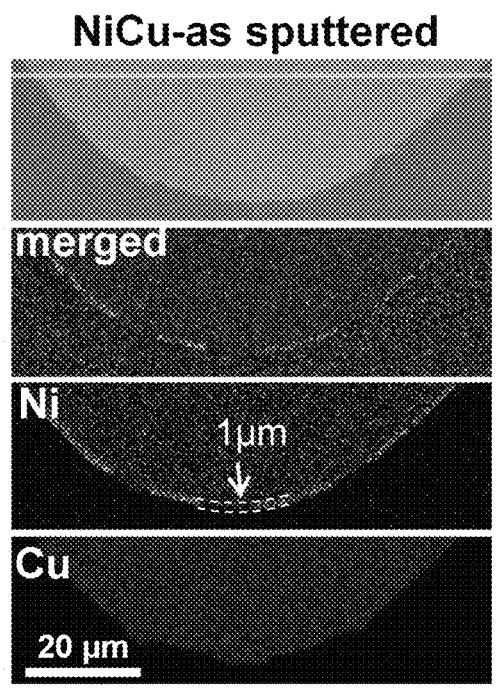
FIG. 3A shows the energy dispersive spectroscopy (EDS) mapping of the average thickness of the Ni-layer circumferentially coated on the copper core wire for a NiCu composite wire material.
Figure 3B:
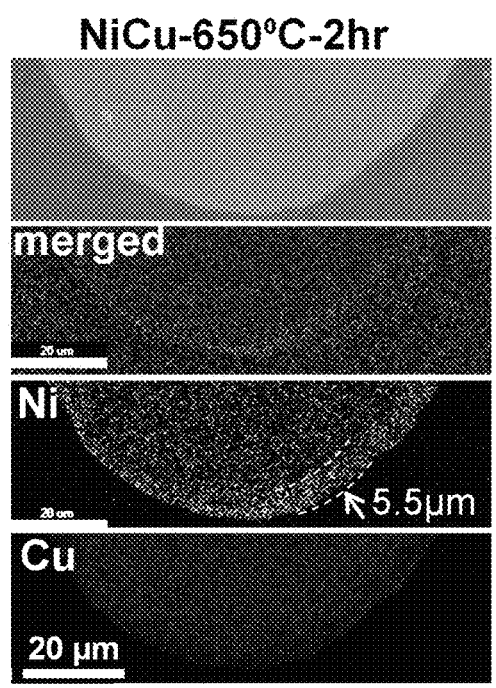
FIG. 3B shows the energy dispersive spectroscopy (EDS) mapping of the elemental distribution of NiCu80 after annealing at 650° C.
Figure 3C:
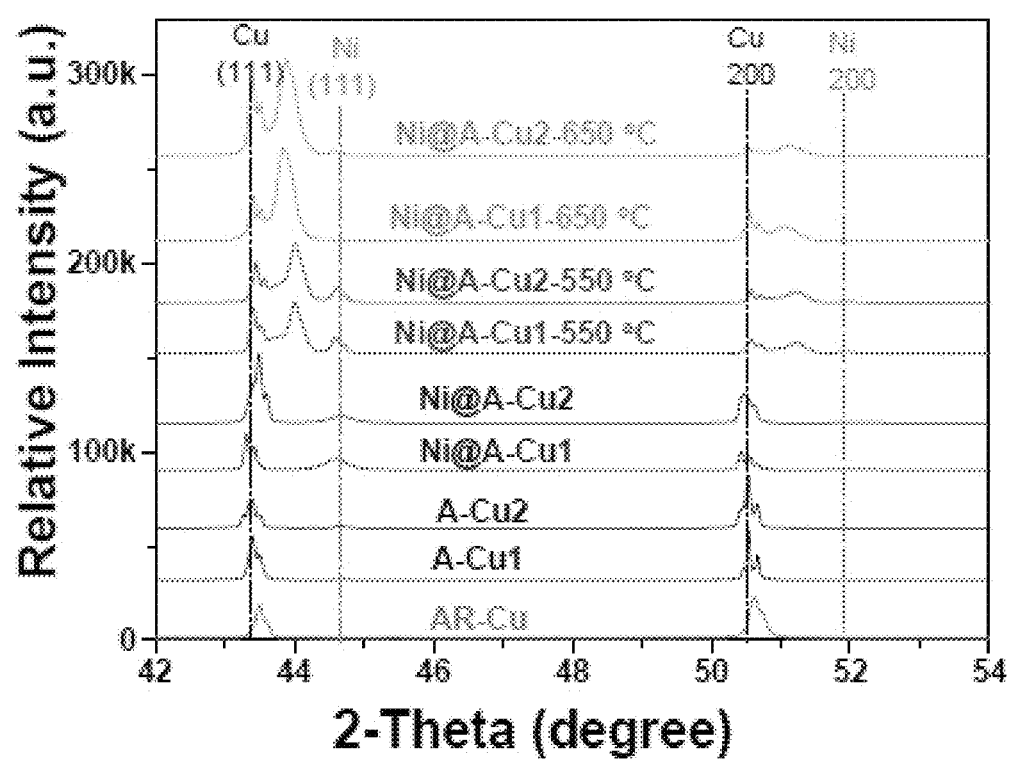
FIG. 3C shows the relative intensity (a.u.) against 2-Theta (degree) of various NiCu composite wire materials.

FIG. 3a,b shows SEM-EDS elemental distribution of the NiCu80 wire before and after 2-hr annealing at 650° C. respectively. The EDS mapping of the as-synthesized NiCu in FIG. 3a shows that the average thickness of the Ni layer (green) circumferentially coated on the Cu core (red) is ~1 μm. The element distribution of NiCu80 after annealing at 650° C. (FIG. 3b) reveals distinct interdiffusion of Ni and Cu where the thickness of Ni rich shell is ~5.5 μm, means that the diffusion depth from interface is about 4.5 μm. The experimental observation and numerical results indicate that annealing NiCu10 wire for 2 hours at 650° C. sets the almost entire volume of the 10 μm wire to be rich in Ni possibly more than 2.4 at % Ni (see schematic for NiCu10 in FIG. 9c), whereas the large portion of the core in NiCu85 with diameter of ~70 μm (FIG. 9c) remains high purity Cu with excellent electrical conductivity. Therefore, the increase (Δρ=174%) in electrical resistivity of NiCu10 after annealing at 650° C. compared to lower resistivity increase in NiCu80 (Δρ=18%) can be attributed to the alloying Cu with Ni through the entire cross section of NiCu10 which set the Ni concentration and electrical resistivity of wire to be higher than 2.4 vol % Ni and $5\times10^{-8}$ Ω·m respectively. The Ni—Cu interdiffusion is again confirmed using the XRD observation (FIG. 3c). Both Cu (111) and Ni (111) peaks can be detected in the as sputtered NiCu samples (blue), whereas only Cu and Ni—Cu alloy are present in the annealed samples. The absence of the Ni peak in the NiCu sample annealed at 650° C. implies that pure Ni is no longer exists at the surface to protect the conductive wire from high temperature oxidation. To understand the observed electrical properties of the NiGCu, we further analyzed the elemental distribution of the Ni shell Cu core composite structure using SEM-EDS mapping, line scan profile and XRD methods. Electrical resistivity is proportional to purity of metal conductor. Because the alloying plays a role in electrical resistivity of a material, electrical resistivity can be improved by preventing interdiffusion in core shell Ni—Cu bimetal.

FIG. 3 Microstructure characterization. EDS-Maps taken from cross section of NiCu80 show the elemental distribution of Cu and Ni on the surface of (a) as sputtered wire and (b) wires annealed at 650° C. for 2-hr. The thickness of Ni rich area increases from 1 to 5.5 μm after annealing at 650° C. due to interdiffusion of Ni and Cu. (c) XRD characterization of as received Cu wire (AR-Cu), annealed Cu wire (A-Cu), Ni coated Cu wire (NiCu) and annealed NiCu wire at 550° C. (NiCu550) and 650° C. (NiCu650).

Figure 4A:
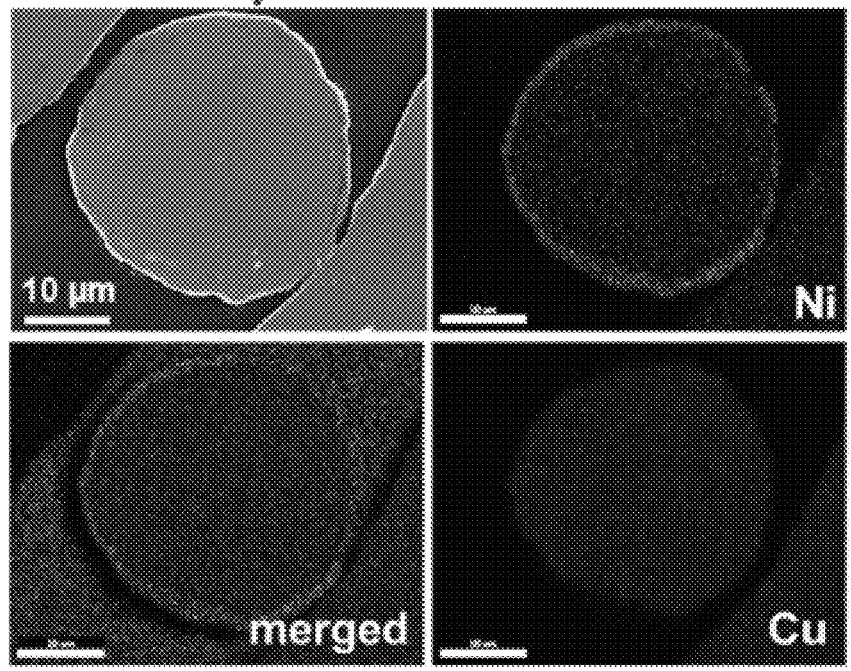
FIG. 4A shows the energy-dispersive spectroscopy (EDS) mapping of NiGCu as-sputtered exemplary composite wire material.
Figure 4B:
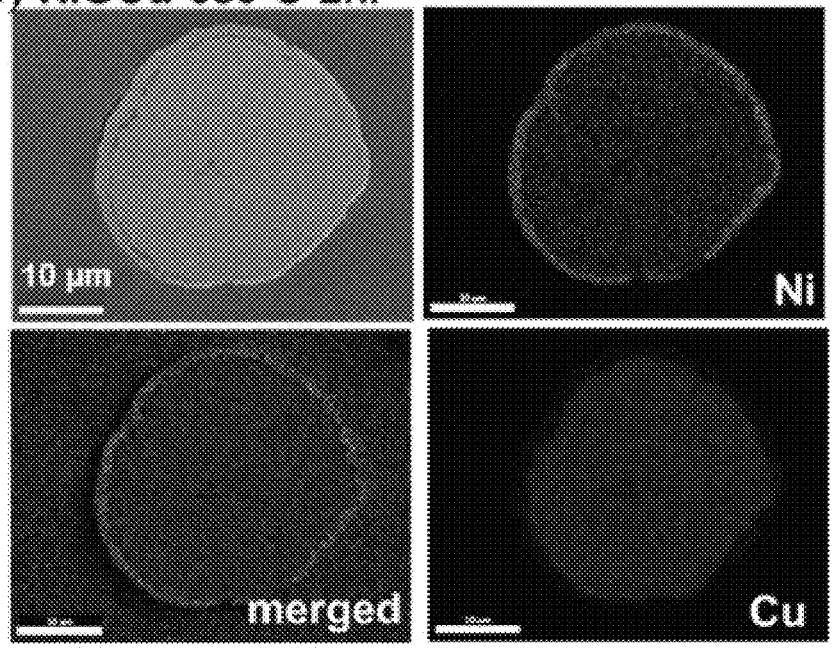
FIG. 4B shows the energy dispersive spectroscopy (EDS) mapping of NiGCu annealed wire core exemplary composite wire material.
Figure 10A:
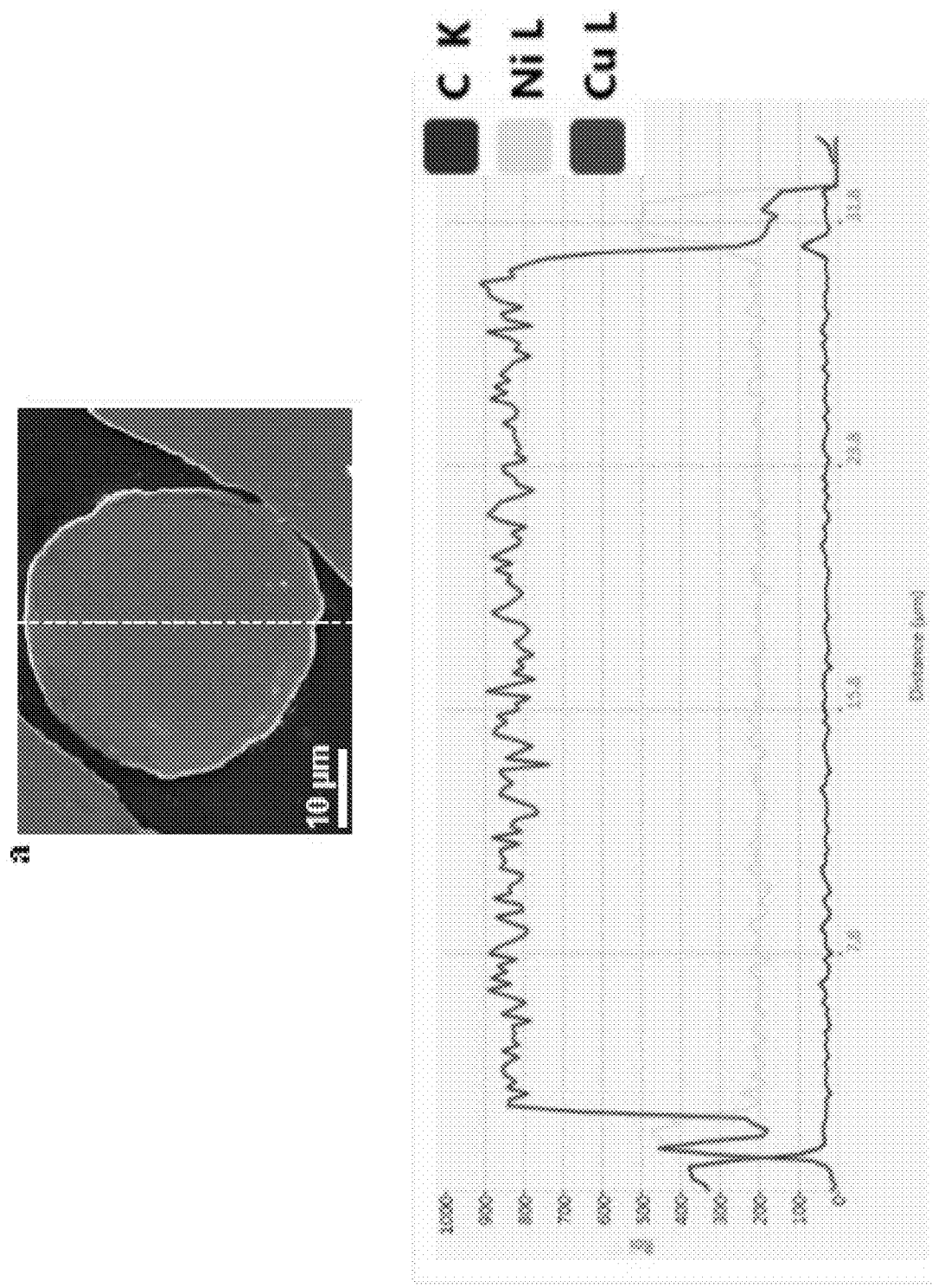
FIG. 10A shows the line scan chemical profile of NiGCu25 of an SEM image before annealing.
Figure 10B:
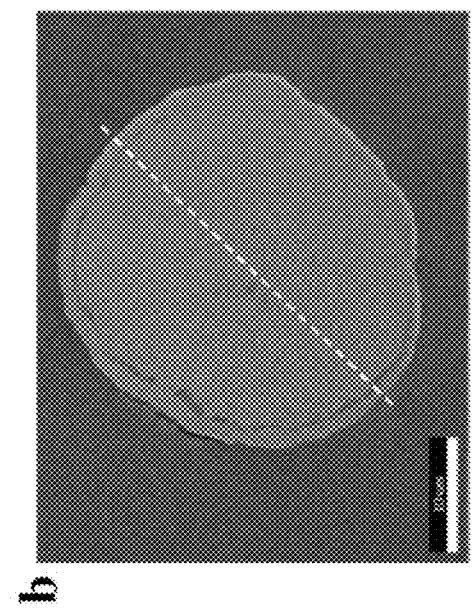
FIG. 10B shows the line scan chemical profile of NiGCu25 of an SEM image after annealing at 650° C.

The EDS mapping of NiGCu25 does not show any changes in the chemical distribution of Ni and Cu; the Ni ring around the Cu core in as prepared (FIG. 4a) and annealed one at 650° C. (FIG. 4b) have almost identical thickness of ~1 μm, confirming excellent thermal stability of the Ni—Cu interface. From the line scan analysis in FIG. 10b, the Ni distribution profile peaked at the surface accompanied with sudden drop at the boundary of Ni—Cu and a carbon peak at the Cu—Ni interface, imply that there is no composition gradient for the annealed NiGCu wires which is same as the line scan analysis of as prepared NiGCu25 (FIG. 10a).

FIG. 4 Microstructure characterization. EDS-Maps taken from cross section of NiGCu25 show the elemental distribution of Cu and Ni on the surface of (a) as sputtered wire and (b) annealed wire at 650° C. for 2-hr show. Annealing does not have visible effect in the thickness of Ni rich zone. (c) XRD characterization of as received Cu wire (AR-Cu), multilayer graphene coated Cu wire (GCu), Ni coated GCu wire (NiGCu), annealed NiGCu wire at 550° C. (NiCu550) and 650° C. (NiCu650). Ni peaks (111) and (200) appears after sputtering Ni on the surface of Cu (Blue graph).

Figure 4C:
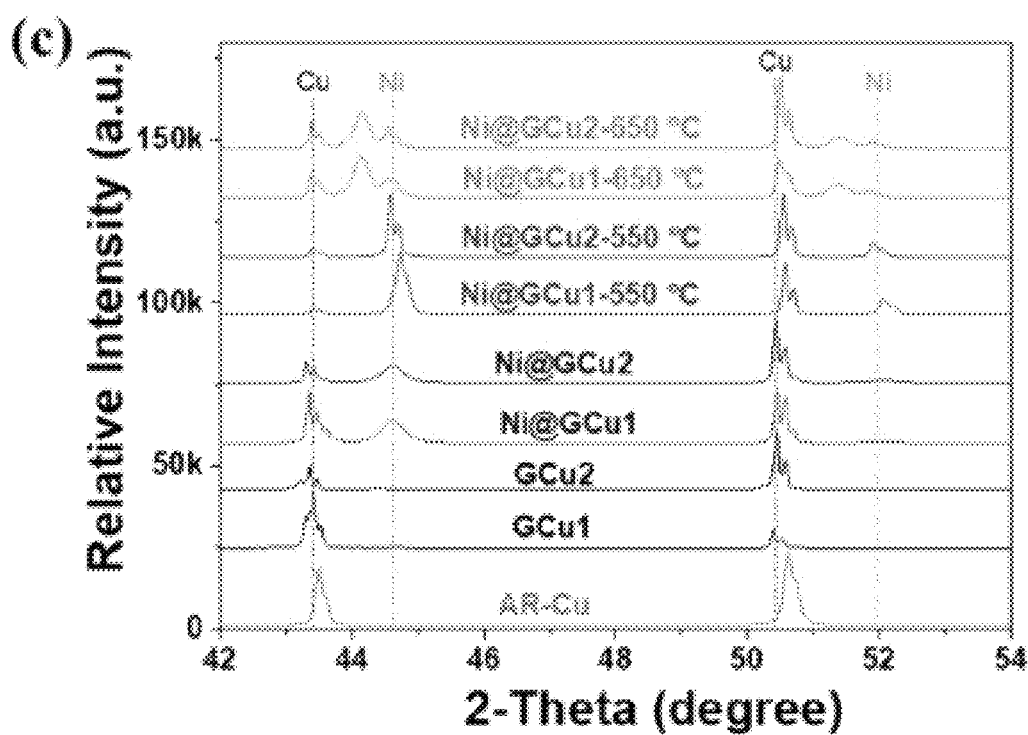
FIG. 4C shows the x-ray diffraction (XRD) characterization of various composite wire materials.
Figure 4D:
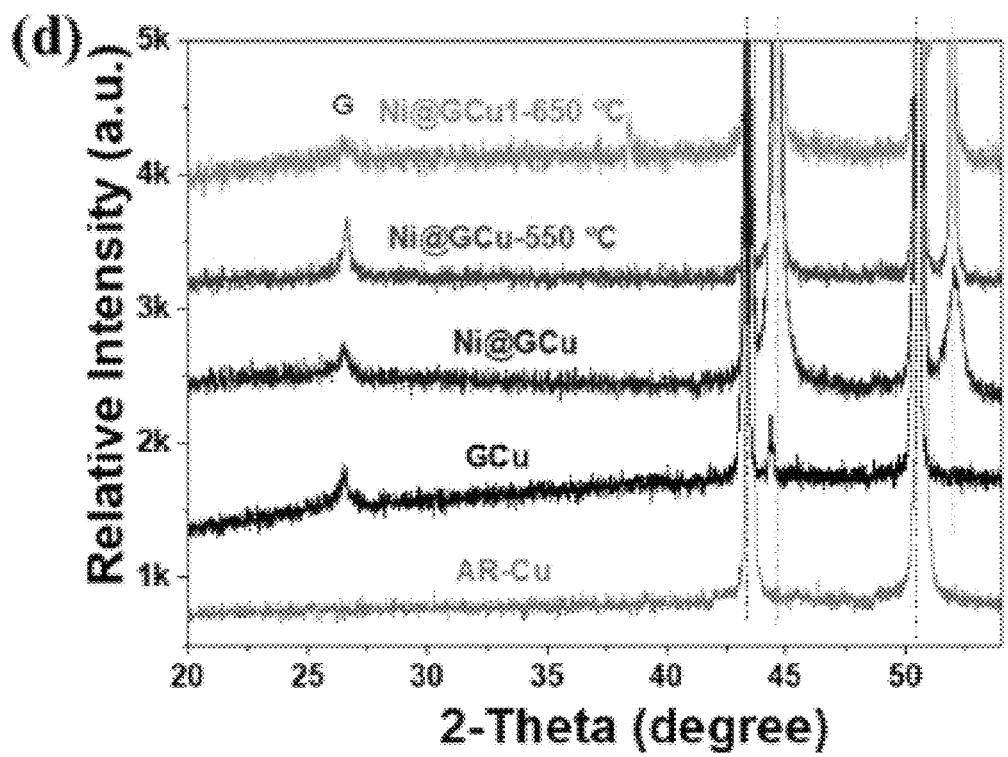
FIG. 4D shows the x-ray diffraction (XRD) spectrum of various composite wire materials.
Figure 5A:
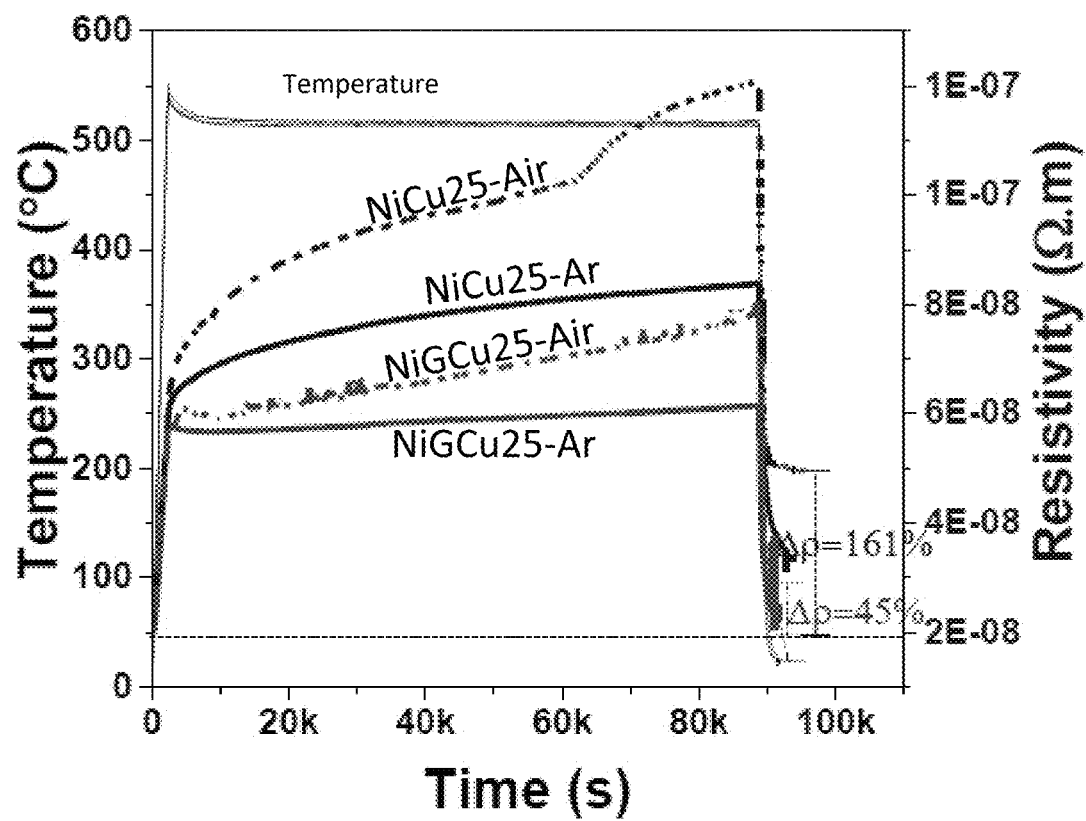
FIG. 5A shows temperature versus time-dependent electrical resistivity of various NiCu and NiGCu composite wire materials.
Figure 5B:
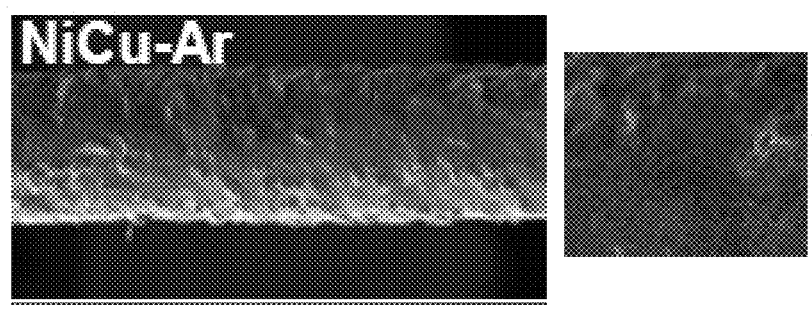
FIG. 5B shows the SEM image of the surface of a NiCu composite wire material in argon (Ar) after a 24-hour thermal cycle.
Figure 5C:
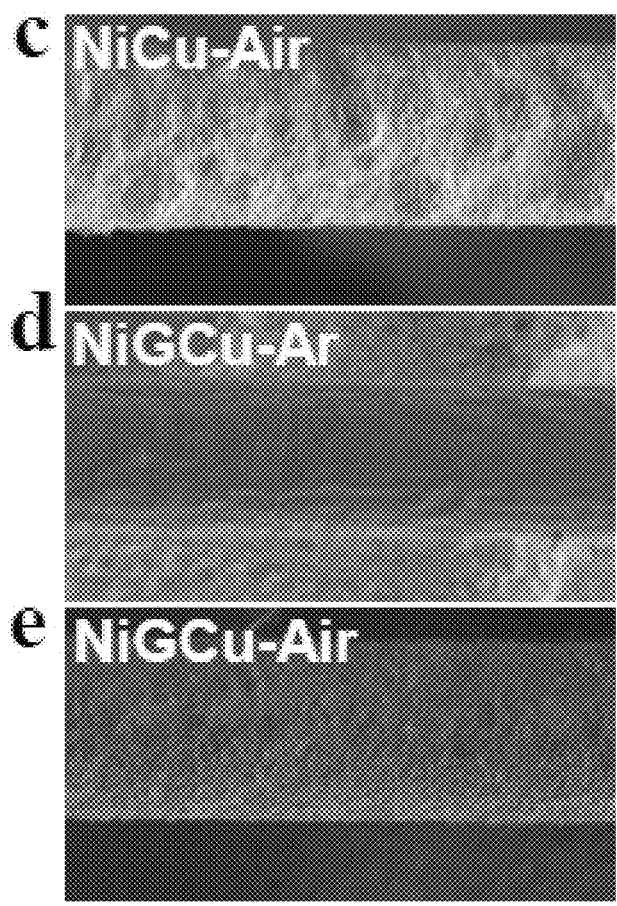
FIG. 5C shows the SEM image of the surface of a NiCu composite wire material in air after a 24-hour thermal cycle.
Figure 5C:
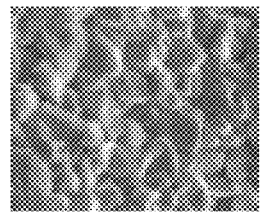
Figure 5D:
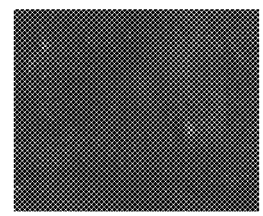
FIG. 5D shows the SEM image of the surface of a NiGCu composite wire material in argon (Ar) after a 24-hour thermal cycle.
Figure 5E:
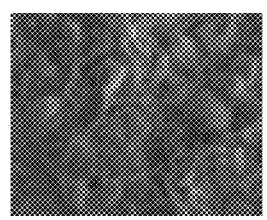
FIG. 5E shows the SEM image of the surface of a NiGCu composite wire material in air after a 24-hour thermal cycle.
Figure 6A:
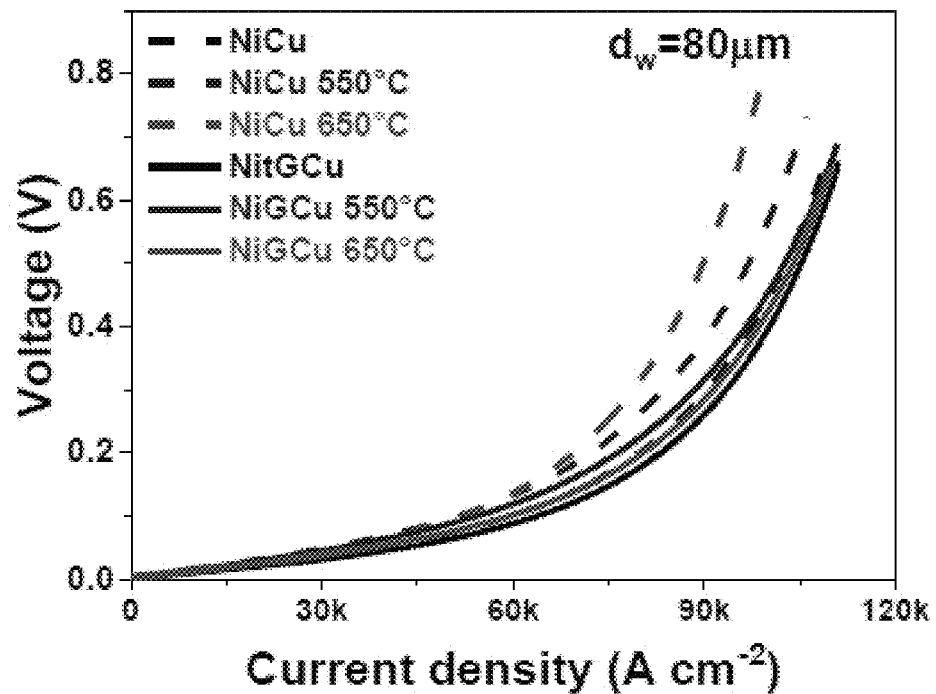
FIG. 6A shows a graph of the voltage versus the current density of a composite wire material with a core wire having a diameter of 80 μm.
Figure 6B:
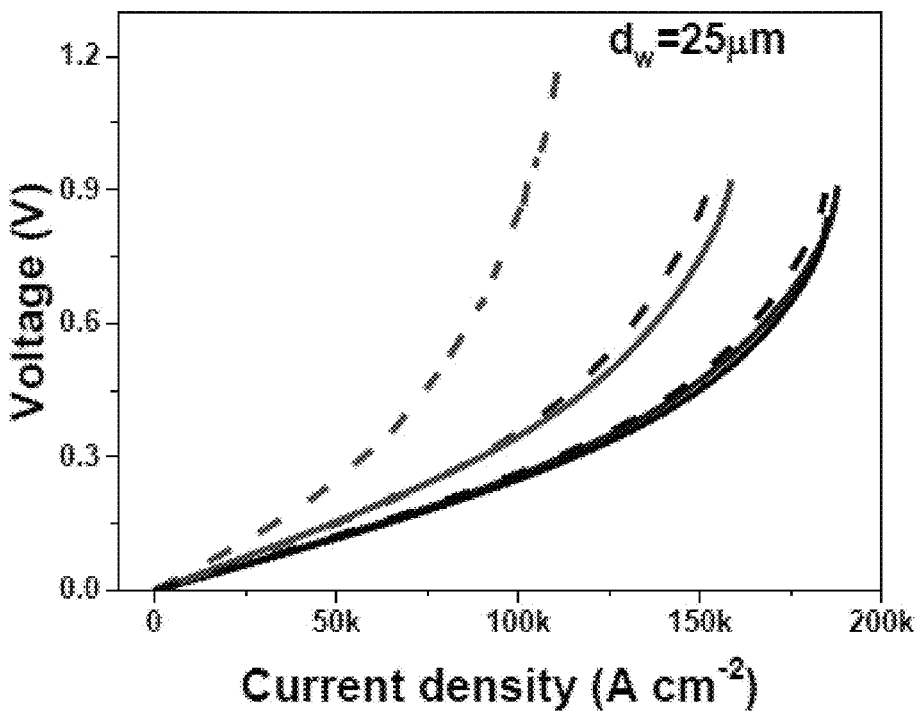
FIG. 6B shows a graph of the voltage versus the current density of a composite wire material with a core wire having a diameter of 25 μm.
Figure 6C:
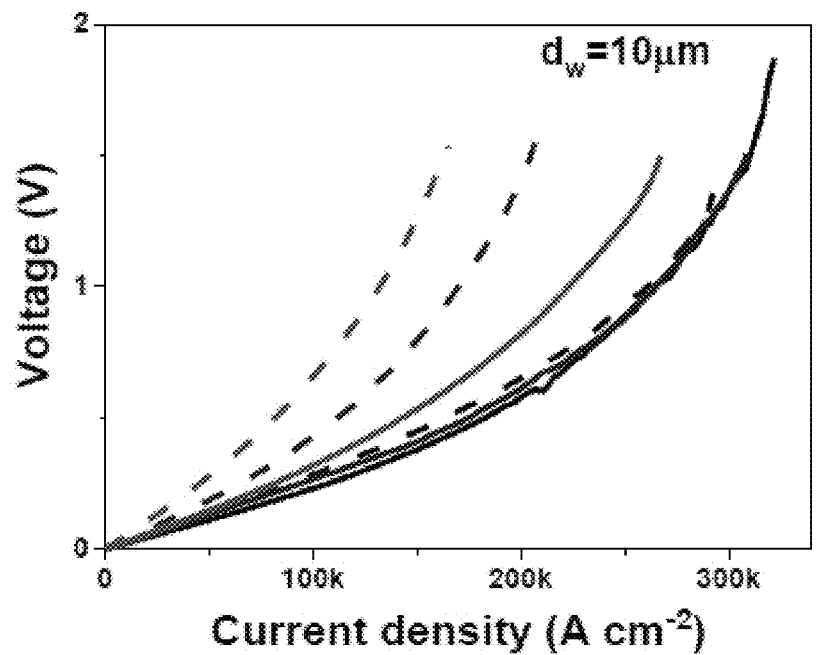
FIG. 6C shows a graph of the voltage versus the current density of a composite wire material with a core wire having a diameter of 10 μm.
Figure 6D:
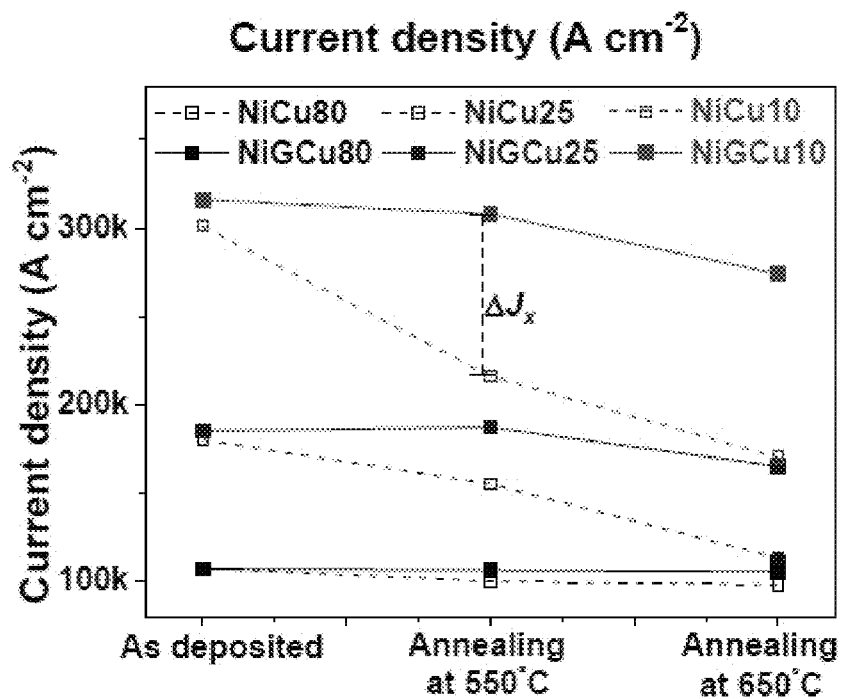
FIG. 6D shows a graph of current density against as deposited, annealing at 550° C., and annealing at 650° C. of various composite wire materials.

The effect of graphene on the thermal stability of the interface is further confirmed by XRD analysis. FIG. 4c shows that, the diffraction spectrum of NiGCu wire before annealing (blue graph) includes Ni and Cu peaks, along with a small (200) peak of graphene at 26.6° (FIG. 4d); these are the same three peaks in the NiGCu wire after annealing at 550° C. (red graph in FIGS. 4c and d). After annealing at 650° C., the intensity of the Ni (111) and graphene (200) peaks slightly decreases, whereas that of the Ni (111) peak in NiCu wire (green graph in FIG. 3b) disappeared, this implies that the entire Ni is mixed with Cu during annealing at high temperature. Ni coated Cu wires suffer from short lifetime at temperature higher than 400° C., because the coupling effect of increase in electrical resistivity from alloying of Ni—Cu and reduction in volume of conductive materials from severe oxidation of diffused Cu to surface, degrade current density limit of the wire, which restricts the highly conductive and oxidation resistance materials for high temperature applications.

The thermal stability of NiCu25 and NiGCu25 wires were examined by 24-hr heating at 550° C., as shown in FIG. 5. We measured the electrical resistivity of the 25-μm-diameter NiCu25 and NiGCu25 wires in Ar and air to decouple the effect of alloying and oxidation, while the temperature and electrical resistivity concurrently monitored during heating, holding, and cooling stages. FIG. 5*a* shows the temperature profile (black line) and the corresponding electrical resistivity of NiCu25 (blue line) and NiGCu25 (red line) measured in Ar (solid lines) and air (dashed lines).

FIG. 5 (*a*) The temperature and time-dependent electrical resistivity of the NiCu and NiGCu wires for $d_w$=25 μm. The temperature (black solid line) and resistivity (blue and red lines are for the NiCu and NiGCu wires, respectively) measurements are synchronized by time. Solid and dashed lines are the resistivity measured in Ar and air respectively. SEM image from the surface of wires after 24 hr thermal cycle (b) NiCu in Ar, (c) NiCu in air, (d) NiGCu in Ar, and NiGCu in air.

Figure 11A:
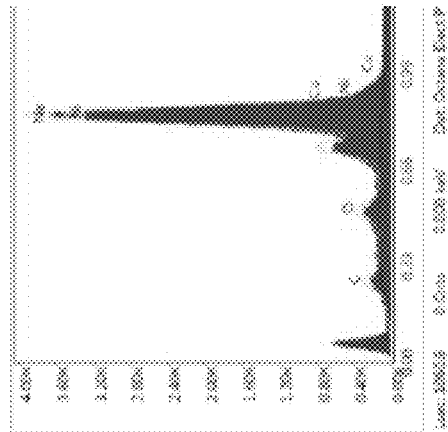
FIG. 11A shows the energy-dispersive spectroscopy (EDS)-elemental distribution and profile of NiCu25 composite wire material before thermal cycle in argon (Ar).
Figure 11A:
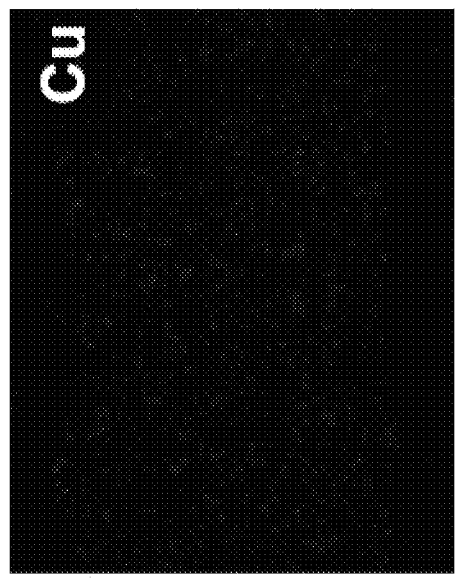
Figure 11A:
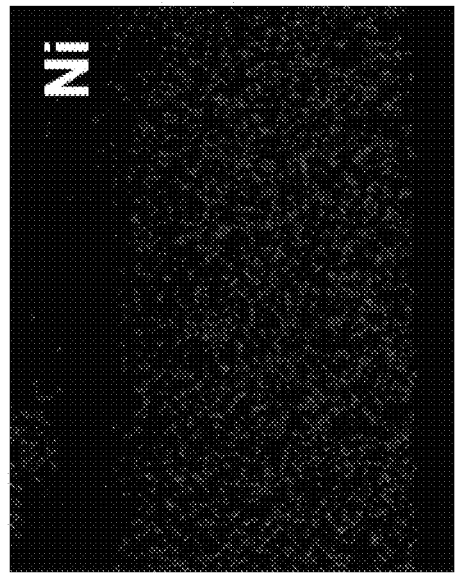
Figure 11B:
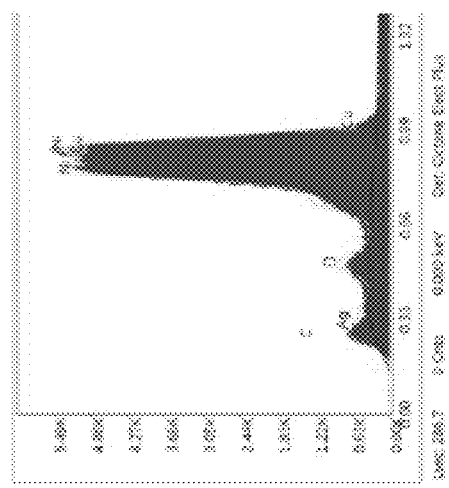
FIG. 11B shows the energy-dispersive spectroscopy (EDS)-elemental distribution and profile of NiCu25 composite wire material after thermal cycle in argon (Ar).
Figure 11B:
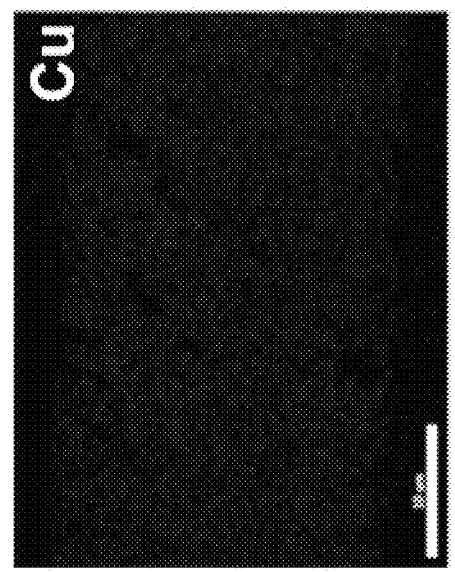
Figure 11B:
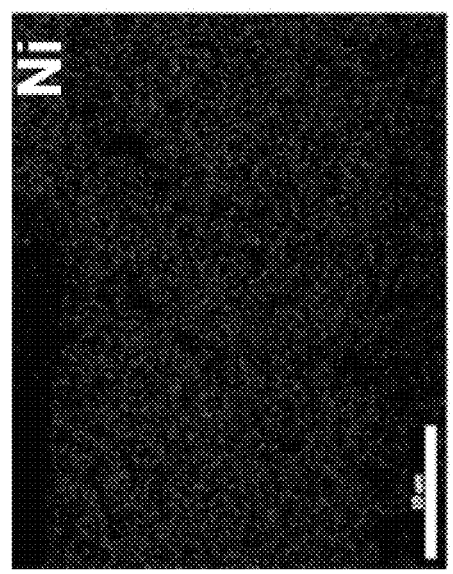
Figure 11C:
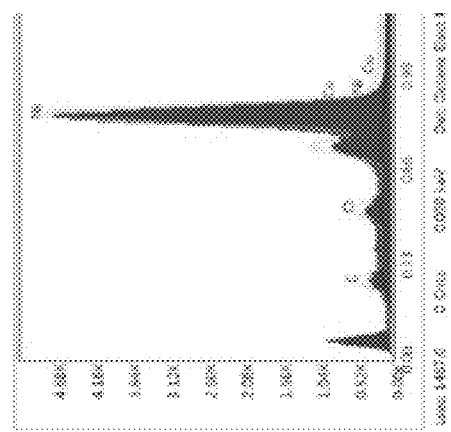
FIG. 11C shows the energy-dispersive spectroscopy (EDS)-elemental distribution and profile of NiGCu25 before thermal cycle in argon (Ar).
Figure 11C:
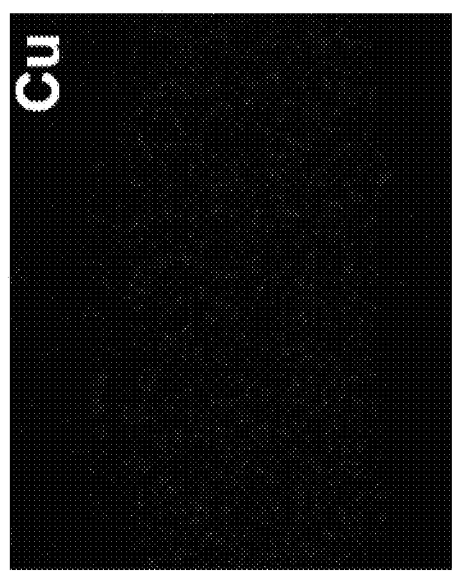
Figure 11C:
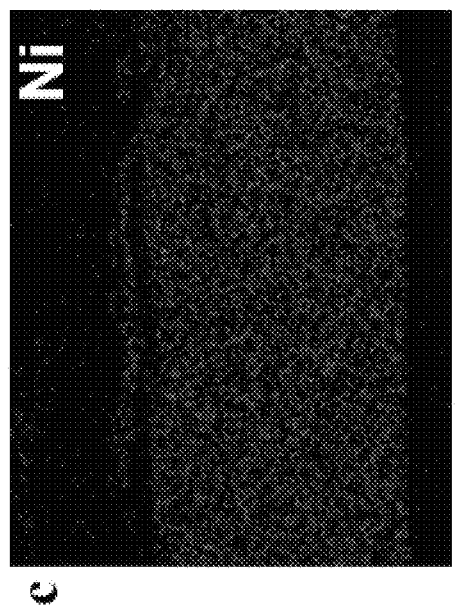
Figure 11D:
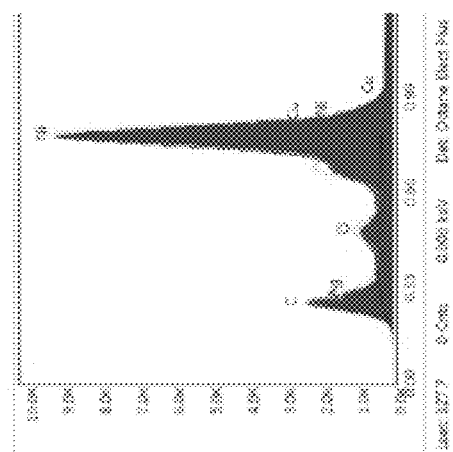
FIG. 11D shows the energy-dispersive spectroscopy (EDS)-elemental distribution and profile of NiGCu25 after thermal cycle in argon (Ar).
Figure 11D:
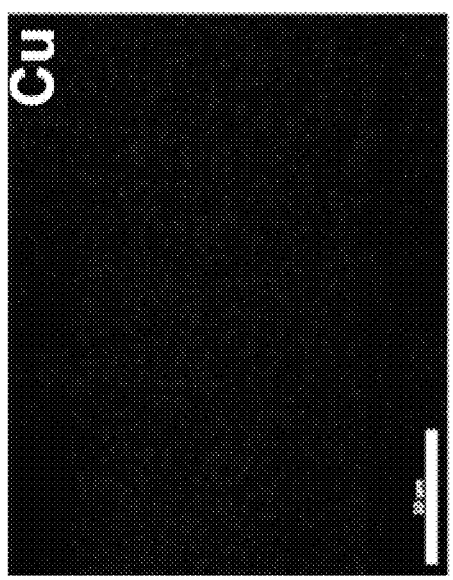
Figure 11D:
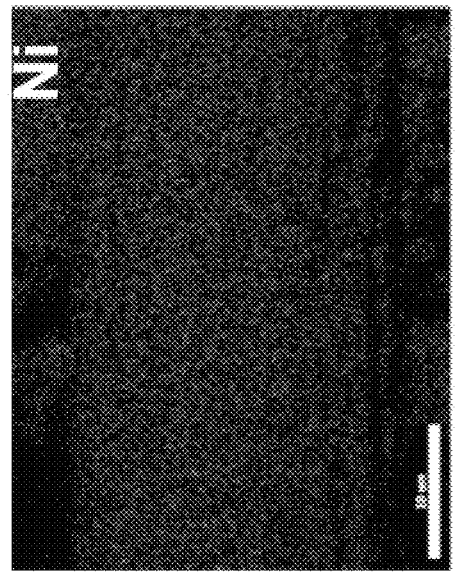
Figure 12A:
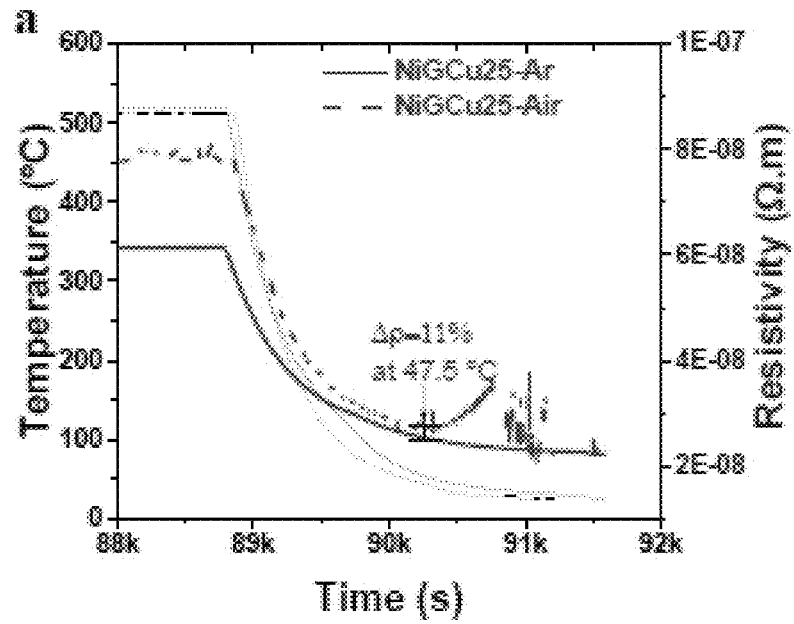
FIG. 12A shows the temperature and time-dependent electrical resistivity of NiCu and NiGCu composite wire materials with a core wire diameter of 25 μm, respectively.
Figure 12B:
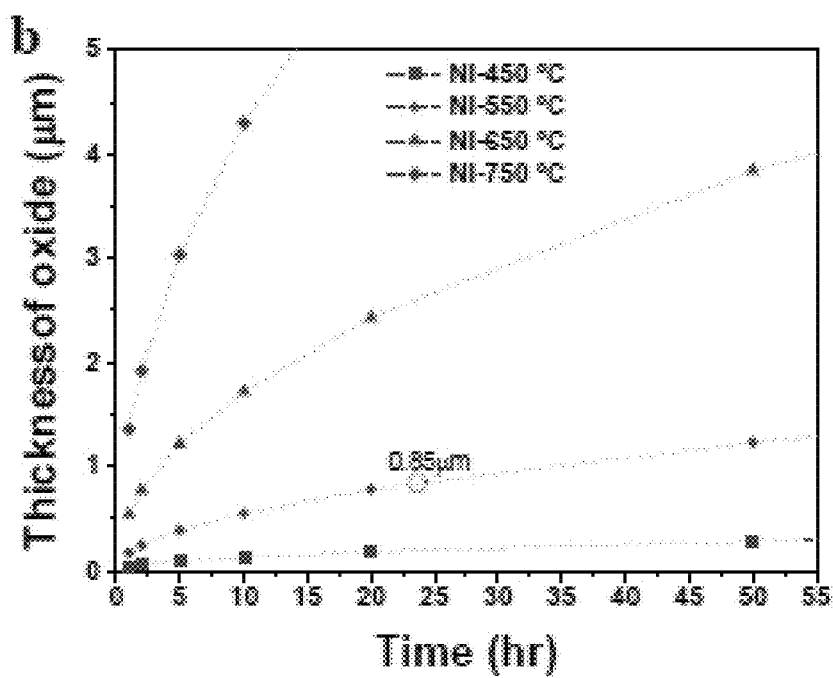
FIG. 12B Shows the time dependence oxidation of Ni at various temperature in air.
Figure 13A:
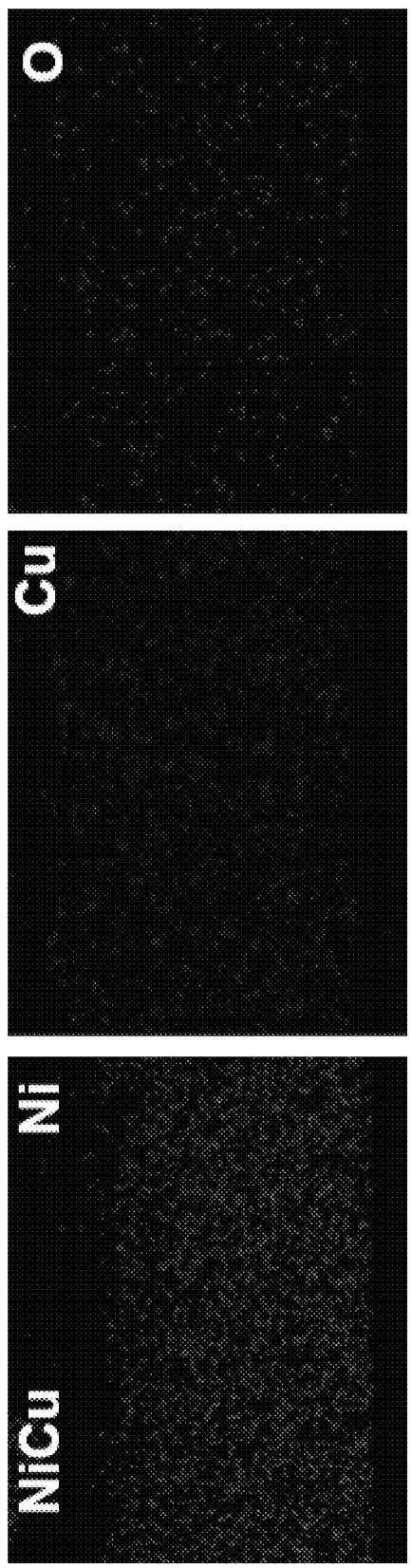
FIG. 13A shows the energy-dispersive spectroscopy (EDS)-elemental distribution and profile of NiCu25 composite wire material before thermal cycle.
Figure 13A:
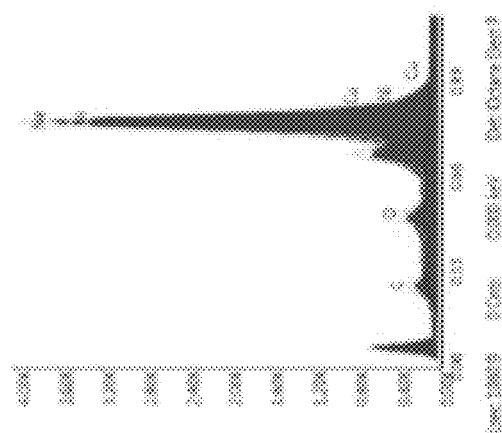
Figure 13B:
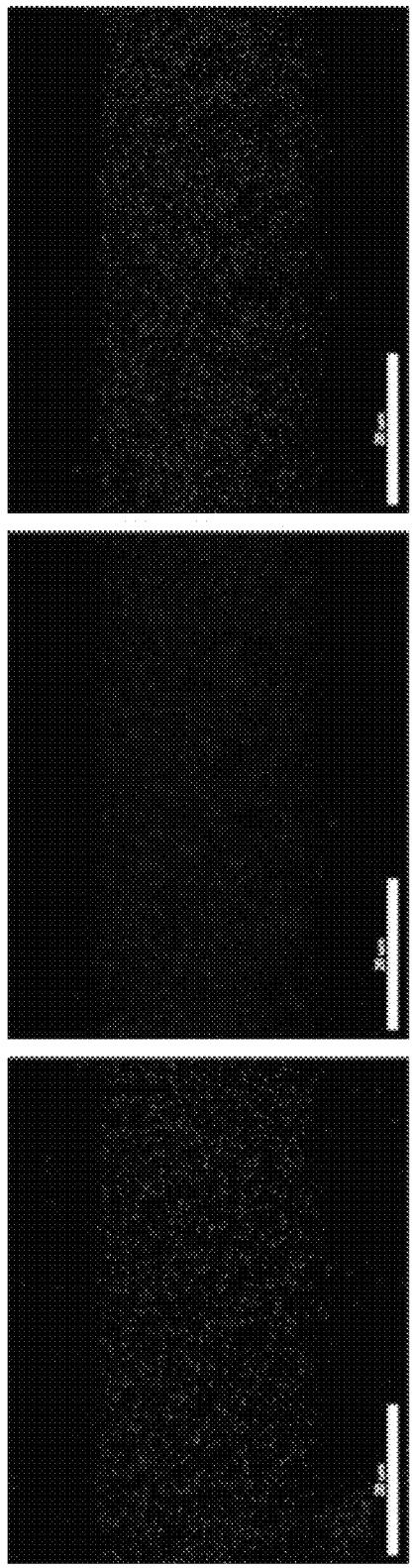
FIG. 13B shows the energy-dispersive spectroscopy (EDS)-elemental distribution and profile of NiCu25 composite wire material after thermal cycle.
Figure 13B:
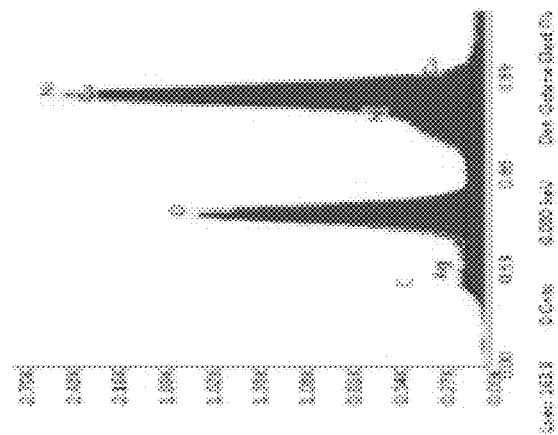

The electrical resistivity of NiGCu25 and NiCu25 wires increases from $1.9 \times 10^{-8}$ Ω·m and $1.99 \times 10^{-8}$ Ω·m to $5.8 \times 10^{-8}$ Ω·m and $5.99 \times 10^{-8}$ Ω·m, respectively, after heating the sample from room temperature to peak temperature of 552° C. in Ar. The NiGCu25 wire displays high thermal stability where its profile in Ar (solid red profile) keeps a relatively flat resistivity plateau during heating stage with high reversible resistivity retention after cooling the wire to room temperature such that its resistivity ($2 \times 10^{-8}$ Ω·m) is very close to original resistivity before thermal cycle. In contrast, the NiCu25 wire exhibits a fast resistivity increase in early stage of heating (solid blue profile), then the resistivity gradually increases to $8.37 \times 10^{-8}$ Ω·m (~40% increase) at the end of 24-hr heating stage. The resistivity after cooling the wire to room temperature is $3.34 \times 10^{-8}$ Ω·m indicating poor retention with ~67% permanent increase in the resistivity of NiCu25 after thermal cycle. Comparing the SEM-EDS elemental distribution of NiCu wire before (FIG. 11*a*) and after (FIG. 11*b*) thermal cycle shows changes in concentration of Cu on the surface, i.e., alloying Ni and Cu takes places during heating which increases the electrical resistivity. Whereas thermal cycle has no obvious effect on the concentration of Ni and Cu on the surface NiGCu25 wire (FIGS. 11*c* and *d*) and hence, excellent electrical properties retention is achieved from thermally stable Ni-G-Cu interfaces. For the NiGCu25 subjected to thermal cycle in air (red dashed profile), the resistivity linearly increases during heating stage and then decrease to $2.75 \times 10^{-8}$ Ω·m after cooling to 47° C. which is 11% higher than the resistivity of NiGCu25 subjected to identical thermal cycle in Ar ($2.47 \times 10^{-8}$ Ω·m at 47° C.). This increase in resistivity is slightly higher than the estimated rise from 24-hr oxidation of pure Ni at elevated temperature (550° C.) that is 7% (see FIG. 12), indicating that ultra-stable Ni—Cu interfaces enhance high temperature operation of wires. For the NiCu25 in air (blue dashed profile), an increased rate of the resistivity at the start of holding stage can be seen, which is most likely related to accelerated Ni—Cu alloying at peak temperature, then the resistivity gradually increases during holding stage under steady state temperature. An anomalous resistivity rising is observed after 16.5 hr oxidation, most likely the sign of Cu oxidation due to excessive alloying and exposing Cu to the surface as confirmed in EDS elemental distribution measurement in FIG. 13.

The Current Density Limits

Current density limit of as prepared and annealed NiGCu wires at 550 and 650° C. were quantitatively measured and compared to that of NiCu wires to highlight the advantages of thermally stable interface from graphene tube for developing high temperature conductors.

FIG. 6 presents the current density input-voltage drop response of NiCu (dashed lines) and NiGCu (solid lines) wires in as prepared (black) and annealed wires at 550° C. (blue) and 650° C. (red) for different diameter: a) 80, b) 25 and c) 10 μm. Regardless of wire diameters, the voltage and current density (V-J) curves of both the NiCu and NiGCu wires exhibit similar qualitative trends—the initial V-J correlation is linear for relatively small current density (i.e., the linear Ohmic law near room temperature) and then a rate of a change of V (i.e., dV/dJ) increases with J as approaching to the end point of each test (i.e., J_max). The nonlinear V-J correlation is likely ascribed to the positive temperature coefficient of resistivity (TCR) of the wires. FIG. 6 reveals that in NiCu samples, annealing reduces the current density of wires. The current density of NiCu10 annealed at 550 and 650° C. are measured to be $1.65 \times 10^{-5}$ A/cm$^2$ and $2.0 \times 10^{-5}$ A/cm$^2$ respectively, which is lower than the that measured for the as sputtered NiCu10 ($2.9 \times 10^{-5}$ A/cm$^2$). Compared with NiCu10 samples, the multilayer graphene tube improves the high temperature performance of the composite wire as the current density of the NiGCu10 annealed at 550° C. remains intact and then slightly decreases to $2.67 \times 10^{-5}$ Acm$^{-2}$ for the sample annealed at 650° C.

FIG. 6 Characterization of the maximum current density for NiCu (dashed lines) and NiGCu (solid lines) wires with different condition, i.e., as prepared (black), and annealed wires at 550° C. (blue) and 650° C. (red) for different diameter diameters of (a) $d_w$=80, (b) $d_w$=25 and (c) $d_w$=10 μm. (d) summarizes the critical current density values (the maximum current density, $J_{max}$) as a function of service temperature. Note that dotted and solid lines are for the NiCu and NiGCu wires while blue, red, and black colors correspond to 10, 25 and 80 μm wire respectively.

Apart from the effect of temperature, the wire diameter also influences the change in the current density of the wires. To ascertain the effect of both temperature and size on the current density limit, the values of current density breakdown ($J_{max}$) are summarized in FIG. 6*d*. The current density reduction in NiCu wires, after annealing at high temperature, shows an evolution when the diameter decreases (see dashed lines). In contrast, the current density reduction in NiGCu wires is minimally affected by annealing (see solid lines). The difference between current density of NiCu and NiGCu which assess the worth of graphene, expressed as $\Delta J_x$, (where the ΔJ is the difference between current density of NiGCu and NiCu at the temperature of x=550 and 650° C.) expands towards both increasing temperature (at fixed diameter) and reduction in wire diameter (at fixed temperature). It is noted that, the $\Delta J_x$ widening due to annealing mainly arises from reduction in the current density limit of NiCu after annealing and slightly contributed from reduction in the current density of NiGCu which can be distinguished from comparing the slope of solid lines and dashed lines. The reasons for the coupling effect of size and temperature on the breakdown current density can be explained by heat generation in wires. The breakdown point is a function of the heat generated in the conducting wire which is product of $J^2\rho$ (J is the current density flowing through the wire, and ρ is the resistivity of wire), hence, materials with small electrical resistivity are typically needed to lower the joule heating and obtain high current density values. The electrical resistivity of NiCu10 wire rapidly increases due to the synergic effect of temperature rise which increase the interdiffusion depth and reducing wire diameter which decreases the volume fraction of highly conductive pure metal as discussed in previously. Likewise, the larger $\Delta J_x$, towards the temperature rise and size reduction can be attributed to the fact that larger increase in the electrical resistivity ($\Delta \rho$) of NiCu is generated towards both temperature rise and size reduction. Consequently, the size dependent temperature effect on the current density reduction can be attributed to size dependent temperature effect in electrical resistivity. The advantageous electrical properties of NiGCu wire at elevated temperature can be ascribed to thermal stability of graphene tube sandwiched between highly conductive Cu core and oxidation resistance Ni shell. The thickness and quality of the graphene layer and its interaction with the metal during high temperature operation can affect its performance. High quality electrically conductive graphene barrier has higher temperature stability compared to monolayer graphene and other carbon derivative that can ensure long time operation of NiGCu wire at high temperature. Additionally, different from metallic diffusion barrier used in micro interconnect conductors, the atomically thin multilayer graphene used in this study has high conductivity comparable to metal core and includes small volume fraction of total composite conductor that has negligible effect on the reduction of conductive metal.

In summary, we report the high temperature stability of a multilayer Ni-graphene-Cu composite wire (NiGCu), which constructed by CVD growth of continuous graphene tube on Cu wire (GCu) and then a thin film Ni is coated on the top of graphene. The design is the use of a graphene tube to hinder the alloying of Cu and Ni at high temperature. The developed wire with relatively low electrical resistivity, exhibits outstanding electrical properties retention and oxidation resistance up to 650° C. far beyond the thermal stability and oxidation resistance current state of art conductors whose application is limited to below 400° C. The enhanced thermal stability in multilayer core-shell wire with continuous graphene impart an excellent combination of low electrical resistivity, high current density, and oxidation resistance, that can be used to push the frontier of multilayer composite manufacturing for potential applications in harsh environment, high temperature and corrosive media.

Experimental Procedure

Fabrication of the Multilayer NiGCu Composite Wires

Multilayer graphene coated Cu (GCu) wire was fabricated using CVD method according to the procedure described in our previous report. In brief, commercial Cu wires with 10, 25 and 80 µm in diameter and purity of 99.99%, were loaded into a CVD furnace as the templates for CVD synthesis of graphene at 1000° C. Before CVD growth, the Cu wires were annealed at 1000° C. under flowing mixed gases of 1500 sccm Ar and 100 sccm $H_2$ for 20 minutes for cleaning of the wire surface and reduction of preexisting oxides. Subsequently, multilayer graphene was grown on the circumferential surface of Cu wires at 1000° C. by introducing 10 sccm benzene (Aldrich, 99.8%, anhydrous, 50° C. heating by an external heating device) to the CVD system for 10 minutes. To fabricate multilayer NiGCu and NiCu composite wires, Ni was coated on the circumferential surface of the GCu and Cu (Cu wire was first annealed at 1000° C. for 20 minutes under 1500 sccm Ar and 100 sccm $H_2$ to attain same underlaying microstructure as one for GCu) wires respectively, using an AJA Orion 5 magnetron sputtering system where a pure Ni target (99.99% purity) was sputtered at base pressures below 1×10–7 Torr at 100 W power and 3 mTorr Ar pressure. The deposition rate was first calibrated to be ~9 nm/min for Ni using a crystal thickness monitor, after that 1 µm thick Ni film was deposited for ~111 minutes.

Microstructure Characterization and Electrical Measurements

The microstructure of the wire samples and the corresponding EDS mappings were characterized by a Helios 5 dual beam field-emission scanning electron microscope equipped with EDS detector. X-ray diffraction (XRD) characterization using X-ray Diffractometer-Powder (Malvern PANalytical Aeris) was performed to study the phases of Cu and Ni coated Cu wires. Raman spectroscopy with an excitation wavelength of 532 nm and the laser power of 5 mW was employed to characterize the structure and crystallinity of the graphene.

Electrical resistivity of each wire was evaluated by four-point electrical measurements for accurate characterization without unwanted effects from the contact resistance and the experimental configurations (e.g., a contact condition between a wire and probes) on the electrical measurements. A custom-made apparatus with four Cu leads (i.e., electrical probes) was used (the outer two leads for applying input current and the inner two leads with a 10-mm separation for measuring a voltage drop). The mechanical contact between leads and a wire sample was secured by using steel clips (see details in FIGS. 7c and d). A Keithley 2450 source meter was used to both supply an electrical current and measure a voltage drop across the sample. Current density measurements of 10- and 25-µm-diameter Cu wires were performed using Keithley 2450 source meter. Keithley 2260-B and Keithley DMM6500 instruments were used as a current/voltage source and multimeter respectively to measure the current density of the 80-µm-diameter Cu wire.

FIG. 7 (a) Fabrication process of NiCu and NiGCu wires. (b) Optical images of annealed (A-Cu) (left), graphene coated (GCu) (middle) and Ni coated GCu (NiGCu) (right) wires (diameter of wire is 80 µm). (c) Schematic illustration of system set up and apparatus used to measure the temperature dependence of electrical resistivity and current carrying capability of wires in controlled environments. (d) A photo showing the apparatus used to measure the temperature dependence of electrical resistivity and current carrying capability of wire in controlled environments.

Figure 8C:
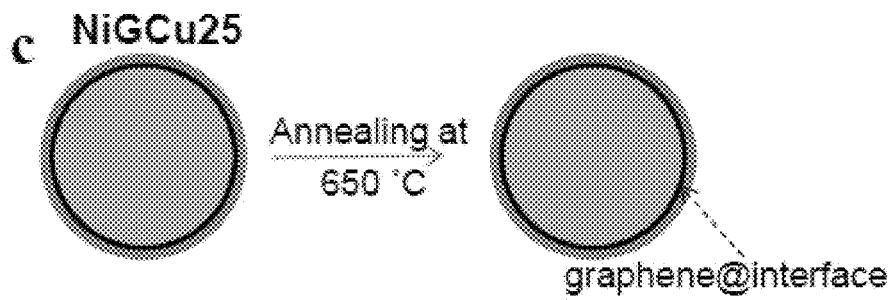
FIG. 8C shows a NiGCu25 composite wire material annealed at 650° C.

Ni—Cu diffusion couples investigated in this study were annealed at 450° C. to 650° C. for 2 hr. For the thin film Ni around Cu wire, the diffusion depth correlated with the temperature and time can be described using the non-steady state diffusion equation:

$$C_{(x,\tau)} - C_1 = (C_0 - C_1) * \left[ 2 \, \mathrm{erf}\left(\frac{h+x}{2\sqrt{Dx}}\right) + \mathrm{erf}\left(\frac{h-x}{2\sqrt{Dx_1}}\right) \right]$$

where $C_{(x,t)}$, $C_1$, and $C_0$ are the concentration of Ni at the depth of x, concentration of Cu at surface and concentration of Ni at surface, respectively. D and h are the diffusion coefficient of Ni in Cu and thickness of Ni respectively. Considering h=1 µm and D=$10^{-15}$ m²/s (at 650° C.), D=$2*10^{-16}$ m²/s (at 550° C.) and D=$1*10^{-17}$ m²/s (at 450° C.), we plotted the chemical profile of Ni distribution for Ni—Cu diffusion couples annealed at 450° C. to 650° C. in FIG. 8a. From FIG. 8a, the Ni—Cu alloying depth, beyond which the wire is consisted of pure Cu, is 3, 6 and 10 µm for the NiCu wire annealed at 450-, 550- and 650° C. respectively. For the NiCu25 sample annealed at 650° C. for 2 hr, a chemical composition gradient through the wire can be generated (FIG. 8b) in which the Ni concentration at the surface of wire is 20 vol % and considering 10 μm alloying depth there is only 7 μm pure Cu core (considering that the diameter of wire after 1 μm Ni coating is 27 μm). Schematic in FIG. 8c shows that the impact stable barrier for preventing Ni—Cu intermixing.

Figure 9A:
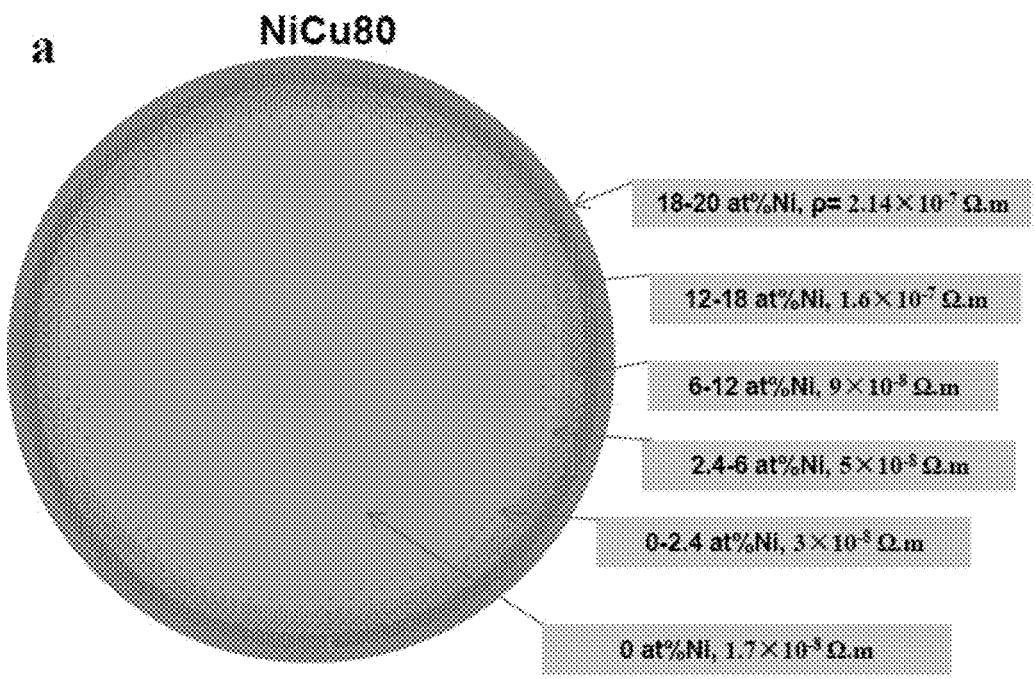
FIG. 9A shows the distribution gradient of a NiCu80 composite wire material annealed at 650° C.

To analyze the size effect temperature dependence of the resistivity we consider the annealed NiCu80 wire (with diameter of 87 μm) with concentric circles geometry (schematic in FIG. 9a). According to the composition profile for NiCu annealed at 650° C. for 2 hr, the alloying depth is 10 μm ranging from 20 vol % Ni at the surface to 0 vol % Ni at the depth of 10 μm. Each circle in FIG. 9a has the thickness of 2 μm and different Ni concentration corresponding to the composition profile (black profile in FIG. 8a). The electrical resistivity corresponds to each circle extracted from the chart in FIG. 9d. Analysis shows that in the case of NiCu80, a Cu core with diameter of 67 μm remains pure Cu with high conductivity whereas in the case of NiCu10 the entire cross section of the wire has Ni concentration and resistivity higher 2.4 vol % and $5 \times 10^{-8}$ Ω·m respectively.

FIG. 8. (a) Ni concentration-distance profiles, calculated by the 'non-steady state diffusion equation' for metal film coated Cu wire after 2-hr annealing at different temperatures. (b) NiCu25 wire before and after annealing at 650° C. shows concentric circle geometry with Ni concentration gradient. (c) A schematic showing the effect of barrier from forming composition gradient due to annealing.

Figure 9B:
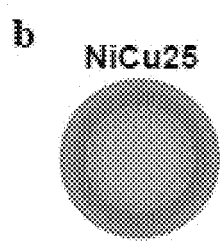
FIG. 9B shows the distribution gradient of NiCu25 composite wire material annealed at 650° C.
Figure 9C:
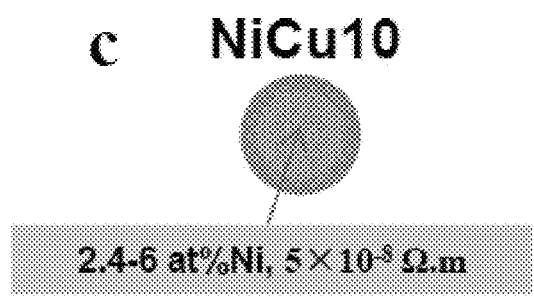
FIG. 9C shows the distribution gradient of NiCu10 composite wire material annealed at 650° C.

FIG. 9. (a) a schematic for NiCu80 with concentric circles geometry showing Ni distribution gradient after annealing at 650° C. Each ring has different Ni concentration (corresponding to profile in FIG. 8a) and electrical resistivity (resistivity correspond to Ni concentration extracted from FIG. 9d) (b) a schematic for NiCu25 and (c) NiCu10 wire showing concentric circle geometry with Ni concentration gradient. (c) Temperature dependance electrical resistivity of Cu with different Ni concentration.

Figure 10B:
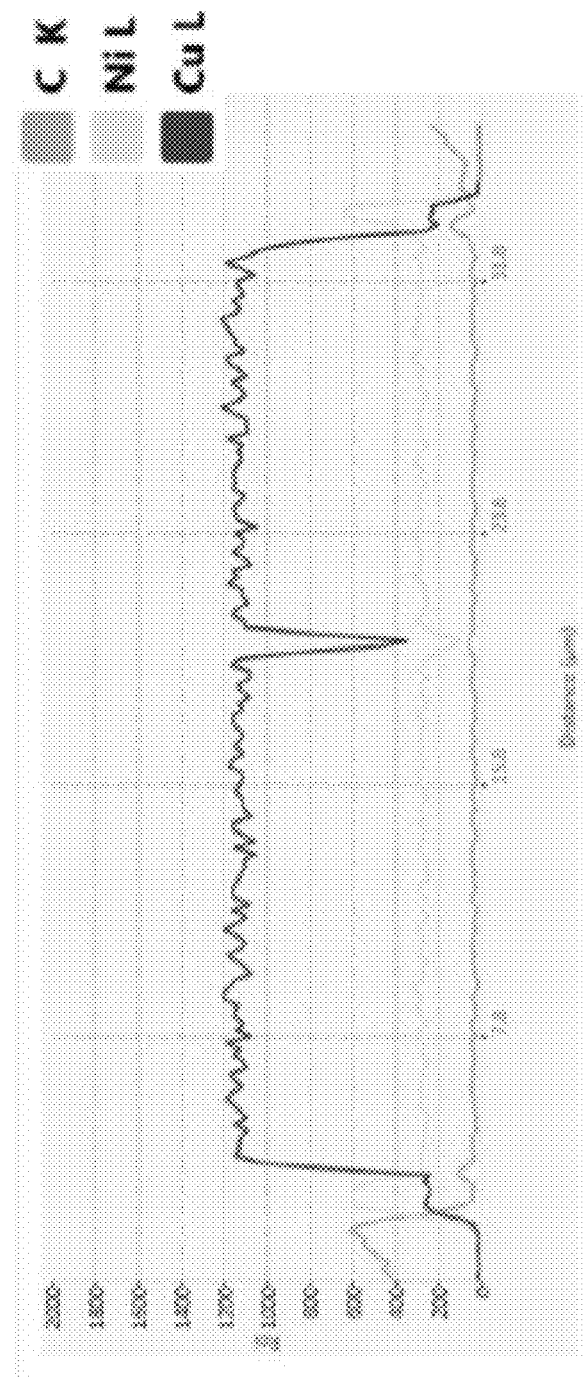

FIG. 10. Line scane chemical profile of NiGCu25 along the white dashed line shown on SEM image, (a) before annealing and (a) after annealing at 650° C.

FIG. 11. EDS-elemental distribution and profile taken from surface of (a) NiCu25, before thermal cycle in Ar, showing very week Cu signal on the map and no Cu peak on the EDS profile (right chart), (b) NiCu25, after thermal cycle, showing strong Ni and Cu contrast on the map and Cu peak on the EDS profile (right chart), (c) NiGCu25, before thermal cycle and (d) NiGCu25, after thermal cycle. There is a week Cu contrast on the map and no Cu peak on the EDS profile (right chart) in c and d.

FIG. 12. (a) The temperature and time-dependent electrical resistivity of the NiCu and NiGCu wires for dw=25 μm. The temperature (black lines) and resistivity (solid and dashed red lines are for the NiGCu wires annealed in Ar and Air, respectively) measurements are synchronized by time. Solid and dashed lines are the resistivity measured in Ar and air respectively. (b) Time dependence oxidation of Ni at different temperatures in Air.

The thickness of the Ni consumed during oxidation at high temperature (Nioxide) can be estimated by using the empirical equation below developed by Utigard $$Cu_{oride} = 23000 \times \sqrt{t} \times \sqrt{e^{(-7.3 - 17300/T)}}$$

where the T (K) is temperature and "t" is time in years. The equation predicts that an approximately 0.85 μm layer of Ni is consumed after 24 hours of oxidation at 550° C., therefore causing ~7% reduction in cross section area and same raise (7%) to the resistivity of wire. There is 11% increase in the electrical resistivity of the NiGCu wire oxidized in air at 550° C. (FIG. 12a) that is slightly higher than the estimated value (7%) in FIG. 12b.

EDS-elemental distribution and profile taken from surface of (a) NiCu25, before thermal cycle, showing very week Cu and O signal on the map and no Cu peak on the EDS profile (right chart), (b) NiCu25, after thermal cycle in air, showing strong Ni, Cu and O contrast on the maps and Cu peak on the EDS profile (right chart).

What is claimed is:

1. A method of making a composite wire material, the method comprising:
    annealing a core wire comprising at least 99.0% copper (Cu) at a temperature of about 850° C. to about 1100° C. under flowing mixed gaseous conditions comprising argon (Ar) and hydrogen ($H_2$);
    coating graphene on a circumferential surface of the core wire to generate a graphene layer; and
    coating nickel (Ni) on the circumferential surface of the graphene layer to generate a nickel (Ni) layer.

2. The method of claim 1, wherein coating graphene further comprises vapor depositing benzene at a flow rate of 8 standard cubic centimeters per minute (sccm) to 11 standard cubic centimeters per minute (sccm) at about 850° C. to about 1100° C. for about 5 minutes to 12 minutes.

3. The method of claim 1, wherein coating nickel (Ni) further comprises sputtering 99.0% pure nickel (Ni), thereby generating the nickel layer on the circumferential surface of the graphene layer.

4. The method of claim 3, wherein the nickel sputtering is performed at a pressure below $1 \times 10^{-7}$ Torr at about 100 W to about 150 W power and about 1 mTorr to about 5 m Torr argon (Ar) pressure.

5. The method of claim 3, wherein the nickel sputtering is performed at about 9 nm/minute to about 10 nm/minute.

6. The method of claim 1, the composite wire material having a nickel (Ni) to nickel-copper (NiCu) volume fraction of about 2 vol. % to about 35 vol. %.

7. The method of claim 1, the flowing mixed gaseous conditions further comprise about 1300 sccm to about 1650 sccm argon (Ar) and about 75 sccm to about 120 sccm hydrogen ($H_2$) for about 15 minutes to about 25 minutes.

8. The method of claim 1, wherein the nickel (Ni) layer has a thickness of about 0.5 μm to about 5 μm.

9. The method of claim 1, wherein the nickel (Ni) layer has a thickness of about 1 μm to about 2 μm.

* * * * *